United States Patent [19]

MacFarlane et al.

[11] Patent Number: 5,146,391
[45] Date of Patent: Sep. 8, 1992

[54] CROSSLINKED ELECTROLYTE CAPACITORS AND METHODS OF MAKING THE SAME

[75] Inventors: Douglas R. MacFarlane, Elsternwick; Arthur K. Philpott, Neerim South; John R. Tetaz, Templestowe, all of Australia

[73] Assignee: Specialised Conductives Pty. Ltd., Neerim South, Victoria, Australia

[21] Appl. No.: 431,600

[22] Filed: Nov. 3, 1989

Related U.S. Application Data

[63] Continuation-in-part of Ser. No. 187,239, Apr. 29, 1988, Pat. No. 4,942,501.

[51] Int. Cl.$^5$ ............... H01G 3/06; C08G 65/32; H01B 7/18
[52] U.S. Cl. ................ 361/525; 252/578; 29/25.03
[58] Field of Search ............ 361/323, 311–315, 361/502, 523–527; 29/25.42, 25.03; 252/62.2, 500, 63.2; 429/213, 194; 128/419 P, 419 PG, 419 PT; 428/409, 421

[56] References Cited

U.S. PATENT DOCUMENTS

| | | | |
|---|---|---|---|
| 3,331,002 | 7/1967 | Everitt | 361/527 |
| 3,869,652 | 3/1975 | Maillot | 361/323 |
| 3,883,784 | 5/1975 | Peck et al. | 361/525 |
| 3,988,496 | 10/1976 | Biggs et al. | 428/383 |
| 4,092,452 | 5/1978 | Hori et al. | 428/215 |
| 4,200,701 | 4/1980 | Wetton et al. | 252/63.2 |
| 4,306,273 | 12/1981 | Maylanot et al. | 361/318 |
| 4,723,347 | 2/1988 | Burzi et al. | 29/25.42 |
| 4,730,239 | 3/1988 | Currie et al. | 361/502 |
| 4,740,869 | 4/1988 | Toshiya et al. | 361/505 |
| 4,787,010 | 11/1988 | Bentley | 361/323 |
| 4,942,501 | 7/1990 | MacFarlane et al. | 361/525 |

Primary Examiner—Donald Griffin
Attorney, Agent, or Firm—Gottlieb, Rackman & Reisman

[57] ABSTRACT

Compact leak-proof electrolytic capacitors including, between the anode and the cathode, an ultrathin layer of a solid electrolyte, are disclosed. The solid electrolyte comprises a solid solution of (a) an alkali metal salt, a transition metal salt, an ammonium salt, an organic ammonium salt, a zinc salt, a cadmium salt, a mercury salt or a thallium salt of (b) a monbasic, dibasic or tribasic acid other than a haloid acid (c) in a polymer of high solvation power. Preferred salts are the tetrafluoroborates and hexafluoroglutarates of sodium and potassium, and the preferred polymer is a blend of polyethylene oxide with a siloxane-alkylene oxide copolymer. Crosslinking of the polymer is accomplished by using an agent which may be a di-, tri-, or polyisocyanate, a multifunctional reagent which is an analogue of the compound to be crosslinked or di- and multifunctional acids, or di- and multifunctional amines. Methods of making such capacitors are also disclosed. Rolled solid electrolyte capacitors of this type are characterized by low volume, absence of electrolyte leakage, and minimum dielectric deformation, and are capable of delivering intense bursts of current on demand, thereby being suitable for use in biomedical electronic devices such as cardiac pacemakers and defibrillators implanted in the human body.

84 Claims, 7 Drawing Sheets

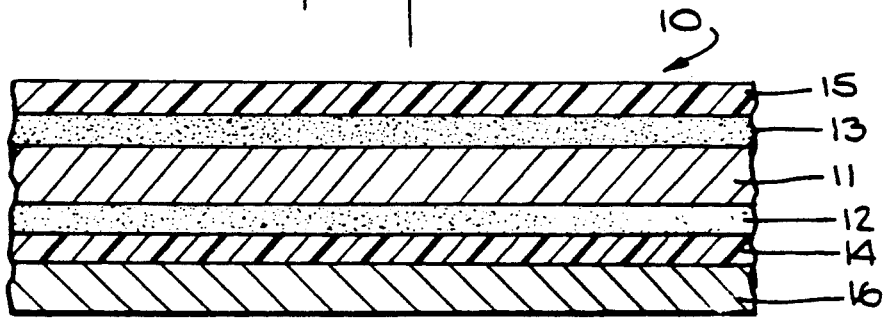
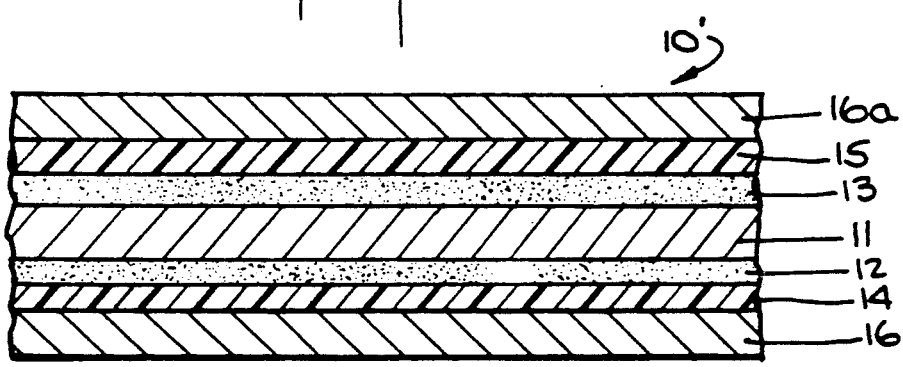
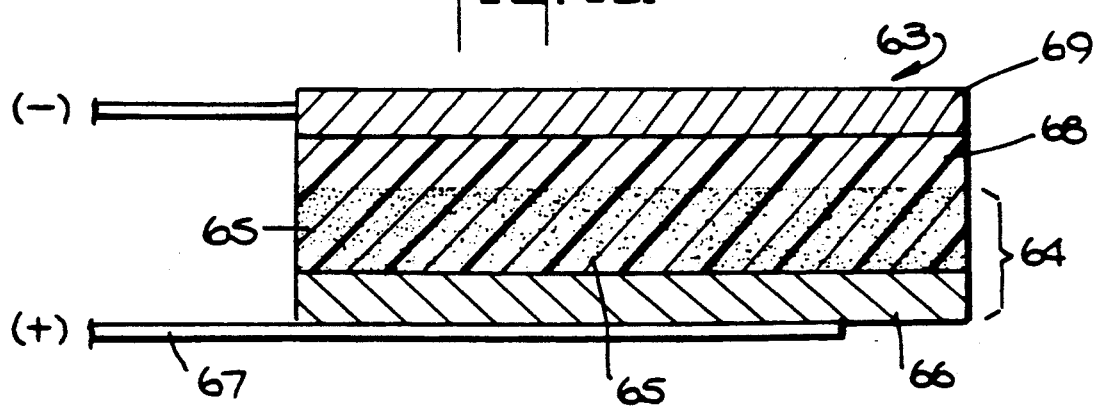

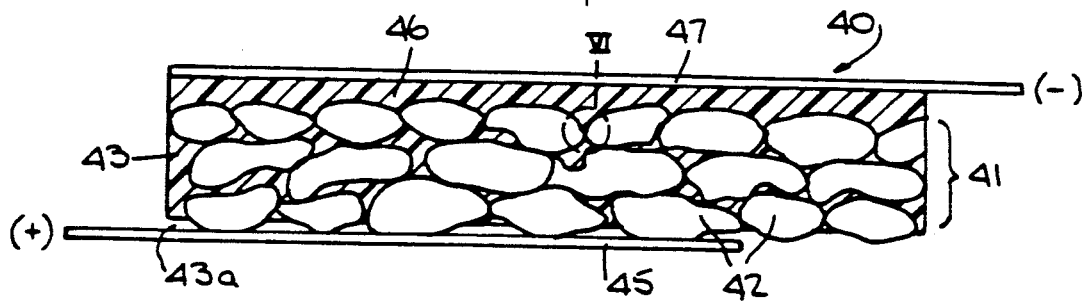
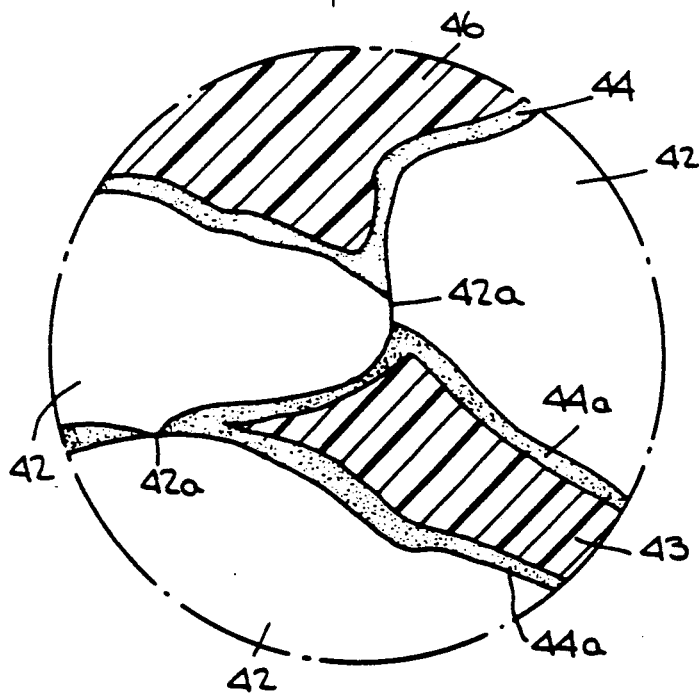
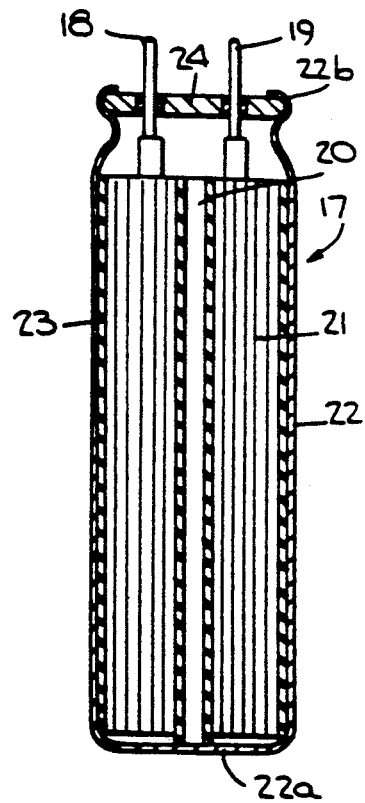

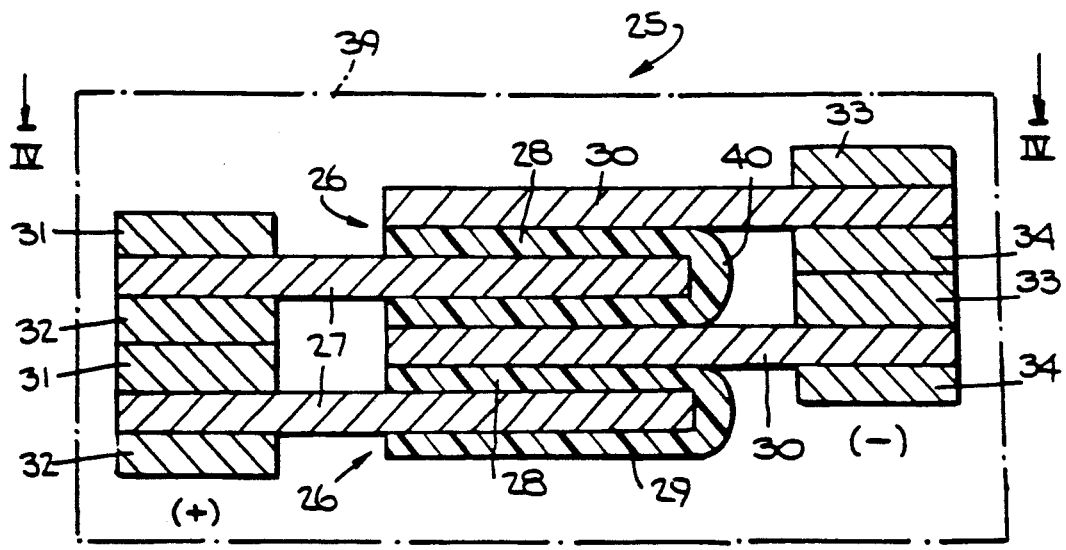
Fig. 3.
Fig. 4.
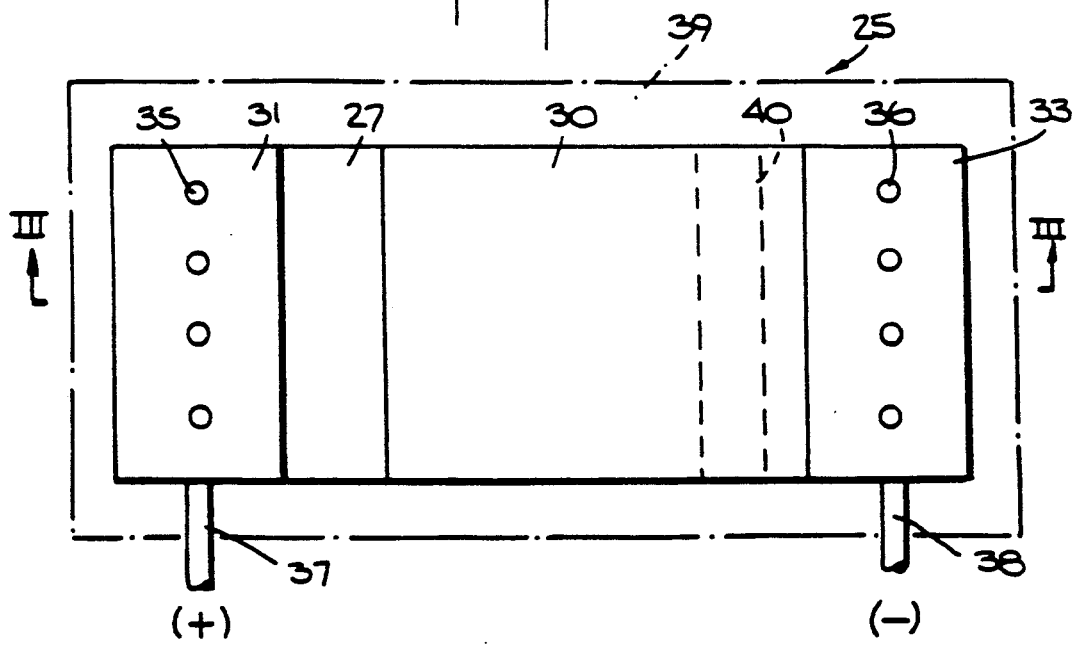

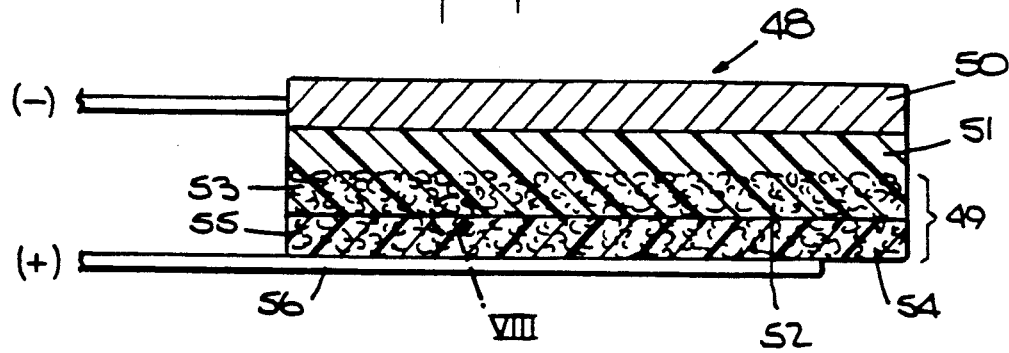
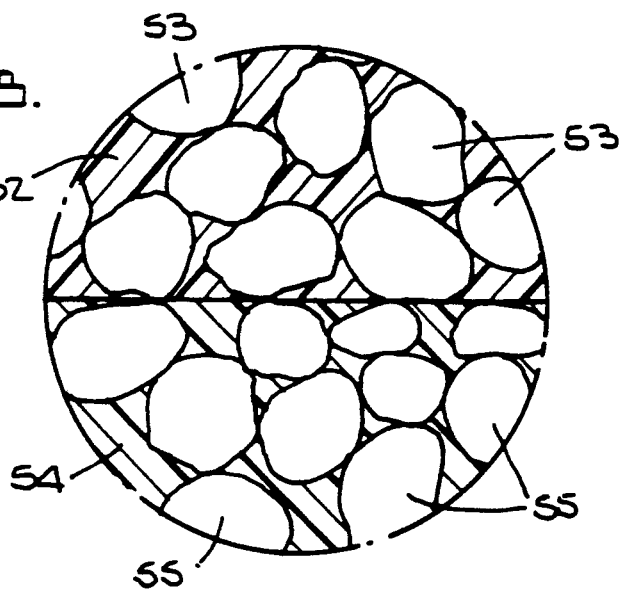
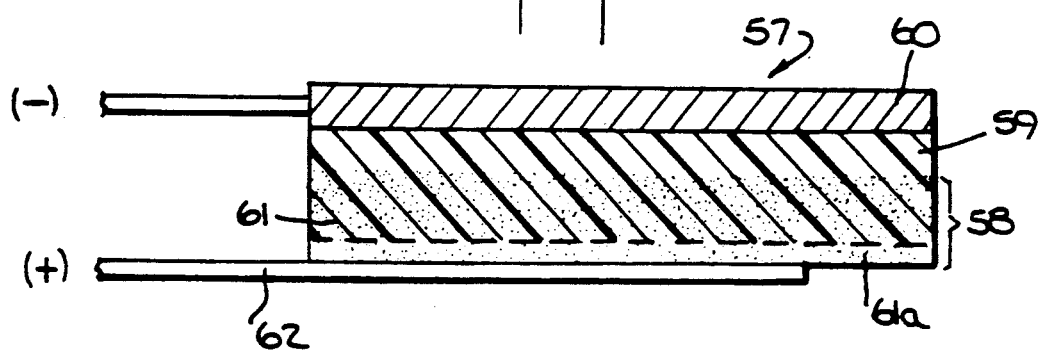

CROSSLINKED ELECTROLYTE CAPACITORS AND METHODS OF MAKING THE SAME

This application is a continuation-in-part of application Ser. No. 187,239 filed Apr. 29, 1988 now U.S. Pat. No. 4,942,501 issued Jul. 17, 1990.

TECHNICAL FIELD

This invention relates to electrolytic capacitors. More particularly it relates to electrolytic capacitors which utilize a solid electrolyte and to methods of making such capacitors. While the applicability of the principles of the present invention is fairly wide and general, for the sake of an orderly presentation, and to facilitate the comprehension of those principles, the description will focus in the first instance on the structural characteristics of and manufacturing methods for solid electrolyte capacitors which are designed to be used in implantable biomedical electronic devices such as cardiac pacemakers and defibrillators.

BACKGROUND ART

Cardiac pacemakers and defibrillators to be implanted inside the human body require associated power supplies which must be provided with a high capacitance in order to be able to deliver intense bursts of current for very short time intervals on demand. That electrolytic capacitors are well suited for performing this function in biomedical electronic devices such as pacemakers and defibrillators is well known. Given the environment within which such a device is used, however, it is essential that the volume of the device be kept to an absolute minimum. Thus, since the capacitor in such a device ordinarily occupies as much as about 30% of the total volume of the device, which is a very high proportion relative to the other electronic components in the device, considerable effort has been expended on the problem of reducing the size of the capacitor as the best way for achieving a reduction in the size of the device as a whole. Nevertheless, attempts to minimize the volume of electrolytic capacitors have met with only limited degrees of success, for a number of reasons.

Conventionally, a capacitor of this type includes an etched aluminum foil anode, an aluminum foil or film cathode, and an interposed Kraft paper or fabric gauze spacer impregnated with a solvent-based liquid electrolyte. The entire laminate is rolled up into the form of a substantially cylindrical body and encased, with the aid of suitable insulation, in an aluminum tube which is enclosed with the other electronics in a hermetically sealed case of a suitable metal (such as titanium, for example) inert to body fluids. However, Kraft paper or gauze fabric are inherently relatively thick. Thus, the presence of those materials will control the ultimate thickness of the rolled up laminate constituted by the anode, the cathode and the paper or gauze spacer, i.e., it will limit the extent to which the size of the capacitor can be reduced.

In any such electrolytic capacitor, of course, there exists the risk that the liquid electrolyte will leak out. Accordingly, the capacitor must be hermetically sealed to prevent any leakage of the liquid electrolyte therefrom, since if the liquid were to come into contact with the other electronic components encapsulated in the device, it could damage them sufficiently to cause the device to fail to operate properly. In extreme cases, the patient's life could then be in jeopardy. Hermetically sealing the liquid electrolyte into the capacitor thus has become standard practice, but this also inherently seals in any gases that may become liberated during the use of the capacitor. To accommodate such gases and prevent a potentially harmful buildup thereof, it has become necessary to provide the capacitor with an expansion or compliance chamber into which the gases can be permitted to escape and accumulate so as to avoid their having any adverse effect on the device. That, however, has entailed an increase, rather than a reduction, in the volume of the capacitor and is clearly an unacceptable expedient for use in a device for which minimization of volume is a critical consideration.

The presence of the liquid electrolyte in such a capacitor entails yet a further disadvantage. As is well known, the face of the aluminum anode is coated with a thin layer of aluminum oxide, which constitutes the dielectric for the capacitor and is formed through an electrochemical action resulting from the application of a positive voltage to the anode. The continued contact of the oxide layer with the solvent-based liquid or gel electrolyte over a period of time, however, especially while the capacitor is not in use, tends to cause the oxide layer to become degraded or "deformed" by being dissolved in the electrolyte, as a consequence of which the shelf life of the capacitor is relatively limited. Ordinarily, of course, the application of a voltage across the capacitor during use would tend to cause the oxide layer to be re-formed, however, the presence of the liquid electrolyte reduces the lifetime of the formed oxide layer. Thus, such a capacitor, in addition to a decreased shelf life, tends to have a shortened useful service life as well.

Among the attempts to achieve a reduction of the volume of such electrolytic capacitors is one represented by U.S. Pat. No. 3,555,369, which suggests the replacement of the conventional Kraft paper spacer or insulator of the capacitor with a thin semipermeable membrane of a polymeric material. Such a membrane would be thin, i.e., less than 40 $\mu$ thick, and preferably its thickness would be between about 1 $\mu$ and 2 $\mu$ or even less. Viewed in the abstract, this proposal might well have enabled a substantial reduction in the volume of the capacitor to be achieved because, given the normal thickness, on the order of about 100 $\mu$ or so, of the aluminum foil components of the capacitor, the size of the rolled up laminate would in essence be determined by the thickness of the foils, with the contribution of the semipermeable membrane layer to the overall thickness being, for all practical purposes, negligible. However, a capacitor according to this proposal requires that the semipermeable membrane must be impregnated with a solvent-based liquid electrolyte. Thus, the electrolytic capacitor of this patent must still be sealed hermetically in order to prevent any leakage of the electrolyte from the capacitor, and that in turn necessitates the provision of an expansion or compliance chamber to accommodate any liberated gases. The provision of such a chamber, of course, negates the volume reduction achieved by the use of the thin spacer constituted by the semipermeable membrane. Further, the presence of the liquid electrolyte in the electrolytic capacitor according to this patent will subject the capacitor to the previously described deformation of the oxide dielectric layer on the anode, and at the same time the presence of the liquid electrolyte will tend to adversely affect the lifetime of the formed oxide layer of the capacitor.

Starting from another vantage point, it has been proposed in U.S. Pat. No. 3,883,784 to produce capacitors in which the spacer or insulator between the anode and the cathode does not include a liquid or gel electrolyte but rather is at least in part a solid "polymeric association product" which, as disclosed in the patent, is a class of polymeric materials characterized by a multiplicity of ionic acceptors and a multiplicity of ionic donors (or interstitial impurities which act as ionic donors). The polymeric material is preferably an association product of polyethylene oxide (providing proton acceptor hydrogen bonding sites) and a polymeric resin such as a phenolic compound (providing proton donor hydrogen bonding sites), and it is suggested in the patent that this material may behave, in many aspects, like a solid electrolyte.

U.S. Pat. No. 3,883,784 discloses that the polymeric association product either may be impregnated into a conventional Kraft paper spacer before the latter is assembled with the metallic anode and cathode, or may be formed as a layer or film interposed (without any associated layer of paper) between the anode and cathode. However, apart from the case of a capacitor with a Kraft paper spacer (which is inherently subject to the limitation on capacitor volume reduction previously referred to herein), the patent further discloses that a film or layer of the polymeric association product when used as the spacer in a capacitor is on the order of about 0.0045 inch to about 0.0085 inch thick (approximately 114 $\mu$ to 216 $\mu$). Thus, the polymeric association product spacers which are described in this patent are far thicker than conventional Kraft paper spacers, and consequently will not only fail to achieve a volume reduction for the capacitor but actually will tend to make the same larger than one utilizing a Kraft paper spacer.

Moreover, notwithstanding the suggestion that some of the various types of capacitors described in U.S. Pat. No. 3,883,784 may act like electrolytic capacitors in certain cases, they are clearly not electrolytic capacitors as that term is understood in the art and do not have the properties of those types of electrolytic capacitors which are suited for use in biomedical electronic devices such as pacemakers and defibrillators. This conclusion is implicit in the fact that the capacitors described in the patent and utilizing a spacer film made of the stated polymeric association product material may be bidirectional rather than polar devices. Thus, such a spacer film will then not be capable of supporting normal electrolytic action at any overvoltage, and placing a high negative voltage on the anodized aluminum electrode will reduce the oxide layer, producing aluminum and, in the presence of the hydrogen ions, hydroxyl ions, all without the capacitor having any substantial oxide layer reforming capability. Also, the capacitance values characterizing the capacitors described in the patent are much smaller than those of normal electrolytic capacitors of comparable size. Finally, the DC conductivity of the polymeric association product material used in forming the spacer films of those capacitors is extremely low for any material ostensibly functioning as an electrolyte.

DISCLOSURE OF INVENTION

It is an object of the present invention, therefore, to provide novel and improved electrolytic capacitors which, by virtue of their structural features, avoid the hereinbefore mentioned as well as other drawbacks and disadvantages of heretofore known electrolytic and quasi-electrolytic capacitors designed for the same purposes.

It is a more specified object of the present invention to provide novel and improved electrolytic capacitors of the aforesaid type the structure of which is characterized by the presence, between the anode and the cathode thereof, of a layer of solid electrolyte constituted of a solid solution of certain metal salts in a polymer matrix, whereby such capacitors are characterized by being immune to any leakage of electrolyte, by having a volume appreciably smaller than that of the heretofore smallest available electrolytic capacitors of comparable constructional and operational properties, and by having improved electrolytic stability and oxide layer reforming properties leading to a longer shelf life as well as a longer useful service life and a relatively higher working voltage.

It is yet another object of the invention to provide a crosslinked solid polymer electrolyte.

It is also an object of the present invention to provide methods for making such solid electrolyte capacitors and the crosslinked solid polymer electrolyte used therein.

Generally speaking, the objectives of the present invention are attained by a compact electrolytic capacitor which includes, between the electrically conductive anode and cathode thereof, an ultrathin layer constituted of a solid electrolyte comprising a solid solution of (a) at least one salt selected from the group consisting of alkali metal salts, transition metal salts, ammonium salts, zinc salts, cadmium salts, mercury salts and thallium salts of (b) at least one acid selected from the group consisting of monobasic, dibasic and tribasic acids other than hydrohalic (haloid) acids (c) in a polymer of high solvation power. As used herein, the term "ultrathin" designates a spacer the thickness of which is in the range of about 1 $\mu$ to about 50 $\mu$ and preferably is in the range of about 5 $\mu$ to about 20 $\mu$.

More particularly, the solid electrolyte according to the present invention is made from a polymer with polar groups capable of imparting to the polymer a high solvation power for the dissolving of ions. To this end, the present invention contemplates production of the electrolyte from a high solvation power polymer such as a homopolymer, or a block, graft or other copolymer, or a blend, or a crosslinked polymer of: siloxane-alkylene oxide copolymers (block, graft and comb); poly(ethylene oxide), poly(propylene oxide), and other poly(alkylene oxide)s: poly(poly(ethylene oxide)methacrylate) and other polymers formed from poly(alkylene oxide) esters of methacrylic acid, acrylic acid and alkacrylic acids generally; poly(alkylene oxide)-poly-(urethane urea) copolymers; comb polymers having a polyphosphazene backbone and poly(alkylene oxide) sidechains; polymers of the poly(alkylene oxide) esters of itaconic acid; polyepichlorohydrin; poly(ethylene succinate), poly(Beta-propiolactone), poly(ethylene adipate), and other polyesters; poly(ethylene imine); poly(N-propylaziridine); or any of the above in which the poly(alkylene oxide) is replaced by poly(alkylene sulfide). Plasticization of the polymer to facilitate its formation into a film or foil is achieved by blending the polymer with up to 60 wt % of a lower molecular weight compound such as poly(ethylene glycol), poly(propylene glycol), and other poly(alkylene glycol)s; any of such materials which have been end-capped with alkoxy, carboxylic acid or other functional groups; propylene carbonate; or glycerol, ethylene glycol and other polyols which optionally may be end capped with alkoxy, acid or other functional groups. Presently preferred is a blend of poly(ethylene oxide) and a poly(methylmethoxy[poly(ethylene glycol)] siloxane) copolymer.

Dissolved in the polymer and constituting the electrolytic or ion-producing component of the solid electrolyte, is a salt of an alkali metal such as lithium, sodium or potassium, or a transition metal such as silver or mercury, or ammonium, of an acid other than a haloid or hydrohalic acid, and in particular of a monobasic acid such as cyanic acid, or a dibasic acid such as carbonic or chromic acid, or a tribasic acid such as boric or phosphoric acid, or a carboxylic acid such as acetic acid, or a dicarboxylic acid such as glutaric, oxalic, phthalic or tartaric acid, or a tricarboxylic acid such as citric acid. Presently preferred salts for use in the case of a capacitor having an aluminum anode are the hexafluoroglutarates and the tetrafluoroborates of lithium, sodium and potassium, the preferred salt is potassium. The molar concentration of the salt in the polymer electrolyte preferably is between 0.005 and 1 times that of the oxygen or sulfur atoms therein.

The polymer electrolyte is crosslinked by an agent which may be a di-, tri or a polyisocyanate and may be selected from the group consisting of hexamethylene diisocyanate, toluenediisocyante and methyl diphenylisocyanate. The crosslinking agent may also be poly(alkylhydrogensiloxane) or a di- or multifunctional reagent which is an analog of the compound to be crosslinked, and may be selected from the group consisting of divinyl, diallyl, dialkacrylic and diacrylic analogs of the compound to be crosslinked The crosslinking agent may also be selected from the group consisting of di- and multifunctional acids or the group consisting of di- and multifunctional amines.

The anode preferably is in the form of a foil of any of a class of metals such as aluminum, tantalum, niobium, tungsten or other anodic metals which are commonly used in the construction of electrolytic capacitors, aluminum foil annealed and deeply etched to maximize its surface area being particularly suitable for the type of capacitor intended for use in cardiac pacemakers and defibrillators. The layer constituted of the solid electrolyte in such a capacitor may be constructed by progressively impregnating and coating the anode foil with increasingly viscous films of the polymer or a solution thereof in a suitable solvent such as acetonitrile. This process ensures complete coverage of the finely etched anode foil (including complete penetration and filling of the etched in pores or depressions) and provides appropriate stress relief to prevent powdering at the anode metal/oxide interface or fracture of the foil. The surface of the solid electrolyte polymer may additionally be crosslinked by chemical or radiative means. This strengthens the polymer film (or the polymer foil, if a foil is used), allowing it to be rolled with the anode and cathode.

The cathode, which in the basic embodiments of the present invention is made of any suitable metal such as platinum, silver, gold, nickel, aluminum, or the like, can be constructed in the form of a foil of such a metal and then laminated with the anode and the solid electrolyte layer. Alternatively, it can be formed in situ as a film by painting, sputtering, evaporating, or otherwise depositing the metal directly onto that surface of the solid electrolyte layer which is directed away from the polymer/oxide layer interface. It is also contemplated by the present invention that the cathode can be constituted of a mass of electrically conductive carbon or other conducting particles in the range of about 0.5 $\mu$ to 5.0 $\mu$ in size deposited in layer formation on the surface of the solid electrolyte layer by means of a suitable polymer ink, or that it can be constituted of a mass of such particles incorporated in layer formation and at a loading of at least 50% in the immediate subsurface region of the solid electrolyte layer. In the first of these variants, either no such particles are found within the solid electrolyte layer, or there may also be a quantity of such particles incorporated in the immediate subsurface region of the solid electrolyte layer but at a loading of less than 50% so that those particles do not constitute a part of the cathode but serve to reduce the internal impedance of the capacitor. In the second variant, of course, a suitable cathode lead will be provided in electrical contact with the embedded mass of particles.

The dielectric, i.e., the oxide of the anode metal, can be formed before or after application of the solid electrolyte to the anode. The method of forming the oxide layer after application of the solid electrolyte entails exposing the electrolyte polymer, before it is hardened, to a controlled humid atmosphere so as to cause a limited amount of moisture to be absorbed by the polymer, and then applying an appropriate electric field between the anode and the cathode. The polymer will then comprise a small amount of a hydroxyl group-containing substance; which may be water. Alternatively alcohol may be used. Preferably, the humidity control is effected by means of a suitable desiccant, e.g., silica gel or phosphorus pentoxide, incorporated in the housing of the capacitor. The presence of the desiccant additionally helps to minimize the subsequent oxide layer deformation rate while concurrently helping to minimize any decrease in the oxide layer reforming capability of the capacitor.

As previously intimated herein, it is also an object of the present invention to provide novel and improved solid electrolyte capacitors which are adapted for use in applications other than pacemakers and defibrillators, and also to provide methods of making such capacitors.

Merely by way of example, it is contemplated in accordance with one modified embodiment of the present invention to provide such a capacitor which includes an anode that is not made of an etched foil of the anodic metal but rather is made of a mass of particles of the metal embedded, in a suitable layer configuration, in a matrix of solid polymer electrolyte. In this construction, the metal particles may be in the form of flakes, powder or microspheres and are in electrical contact with one another throughout the layer-forming mass, with each particle being coated by a thin dielectric oxide layer. The overall thickness of the polymer matrix is somewhat greater than that portion thereof which accommodates the anode-forming mass of particles, thereby to provide an excess quantity of the solid electrolyte which is free of the metal particles and which is to constitute the ultrathin layer of electrolyte between the anode and the cathode. The ultrathin electrolyte layer portion of the polymer matrix may be formed either jointly with or after completion of the impregnation of the mass of metal particles in the polymer.

To facilitate the application of potential to the anode, an anode connector lead in the form of a foil, wire or other suitable electrical conductor is electrically connected to the mass of anode-forming particles, for example, by having a portion of the particulate mass protrude from the electrolyte polymer matrix so as to be able to be connected directly to the lead, or by having a thin layer of an insulating polymer over the electrolyte polymer matrix at the location of the particulate anode and filled with a sufficient quantity of the anodic metal particles to provide an electronic connection between the anode connector lead and the anode without providing an ionic connection therebetween. Such a capacitor is particularly suitable for use in applications where a stacked configuration, including a plurality of individual capacitance units each including an anode, a cathode and an interposed solid electrolyte layer, is desired.

It is further contemplated that in accordance with yet another embodiment of the present invention the principles thereof may be embodied in a capacitor, known as a double layer capacitor, which does not include an anode made of anodic metal and hence does not include an oxide dielectric layer. Such a capacitor utilizes a porous mass of electrically conductive carbon particles embedded in a layer formation in a solid polymer electrolyte matrix to constitute the anode of the capacitor. The particles may be loose or sintered into the form of a porous body. An anodic connector foil is electrically connected to the layer of carbon particles, and an ultrathin layer of solid polymer electrolyte devoid of carbon particles is interposed between the latter and the cathode. The degree of impregnation of the mass of carbon particles by the solid polymer electrolyte is such that each comprises about 50% by volume of the total anodic body. A capacitor of this type, since it does not use anodic metal and hence does not include a dielectric layer, is not suited for use in a high frequency or high voltage environment but is capable of providing a high capacitance and low voltage capability which makes it suitable for use in a variety of applications, e.g., a miniaturized computer memory backup.

The solid electrolyte capacitors according to the present invention provide a number of advantages. Among these are:

1. Better linearity of capacitance with applied voltage. Generally, conventional aluminum electrolytic capacitors have an energy storage value or capacitance which increases with applied voltage. This is probably due to penetration of the liquid electrolyte into the aluminum oxide surface coating on the anode. Sometimes, however, such penetration is undesirable, as it can result in a change in the dielectric characteristics and hence in a distortion of the waveform in pulse applications. Because the capacitor of the present invention does not use a liquid solvent in the electrolyte, any tendency toward variation of capacitance with applied voltage is greatly reduced.

2. Higher breakdown voltage. All other things being equal, the solid electrolyte capacitor of the present invention is characterized by a higher breakdown voltage than is normally found in conventional electrolytic capacitors. An improvement in excess of 5% in breakdown voltage over, for example, Rubycon ® capacitors results by virtue of the action of the electrolyte of the present invention. For example, if a capacitor made with a high purity etched aluminum foil and a conventional liquid electrolyte has a dielectric breakdown voltage of 350 volts DC, an identically constructed capacitor utilizing a solid electrolyte according to the present invention would provide an increase in the breakdown voltage to 390 volts, and even voltages in excess of 400 volts are achievable at acceptable leakage currents. Furthermore, if a 100 $\mu$ thick layer of solid electrolyte is used, the breakdown voltage for the dielectric can be increased from the nominal rating of 350 volts.

3. Higher capacitance per unit area. In the capacitor of the present invention, the dielectric oxide layer cannot be hydrated or otherwise penetrated by the electrolyte; thus, a more compact oxide layer results. This produces a higher capacitance per unit area of etched anode foil than is obtained with liquid electrolytes at a given voltage. An improvement in excess of five percent over, for example, Rubycon ® capacitors results by virtue of the electrolyte of the present invention. For example, a segment of foil having a discharge capacitance of 0.74 $\mu$F per $cm^2$ in a liquid electrolyte is found to have a discharge capacitance of 0.87 $\mu$F per $cm^2$ in the solid polymer electrolyte of the present invention. Solid polymer electrolyte capacitors according to the present invention are further found on discharge to deliver significantly more charge than would normally be expected on the basis of the anode foil surface area in a liquid electrolyte capacitor.

4. Lower electrical leakage and improved shelf factor. In a conventional capacitor provided with a liquid or gel electrolyte, electrical leakage increases with age because of parasitic electrochemical reactions which break down the insulating oxide layer coating the anode. The solid electrolyte capacitors of the present invention have a much lower electrical leakage at any given voltage and are much less susceptible to dielectric layer deformation because of the absence of a liquid electrolyte. Consequently, the increase of electrical leakage with age of such capacitors is substantially reduced and their shelf life is materially enhanced. For example, for capacitors using an electrolyte composition according to the invention including sodium tetrafluoroborate, in tests at 60° C. for 1,000 hours, deforming of the oxide layer may be limited to 4% as opposed to up to 40% for prior art capacitors of the Rubycon ® type.

5. Reduced capacitor size Leakage of the liquid or gel electrolyte from a conventional electrolytic capacitor is a significant problem in high reliability applications. For such an application it is necessary, therefore, to hermetically seal the capacitor housing to prevent the electrolyte from leaking out, and the housing also requires an additional free volume serving as a compliance or expansion chamber for evolved hydrogen. In a capacitor according to the present invention, the electrolyte, being solid, does not leak or diffuse out of the capacitor, and the capacitor housing thus does not need to be hermetically sealed. The size of the capacitor is, consequently, greatly reduced vis-a-vis that of a conventional liquid electrolyte capacitor, which is a substantial advantage where the capacitor is intended for use in a cramped environment, e.g., in an implantable biomedical electronic device such as a pacemaker or defibrillator, or in a miniaturized computer memory device, or the like.

6. High discharge current density and low dissipation factor. The present invention enables very high current discharges and low dissipation factors to be achieved in a completely solid electrolyte because of the presence therein of a highly polar polymer such as the siloxane-alkylene oxide copolymers which allow the solvation of alkali metal salts (such as, for example, potassium hexafluoroglutarate, sodium tetrafluoroborate, lithium thiocyanate, and the like).

7. Improved utilization of anode foil strength. The solution of the solid electrolyte of this invention in acetonitrile has a low viscosity before curing and can penetrate pores less than 0.025 μ wide. Thus, the highly etched foil used in aluminum electrolytic capacitors, which is normally quite fragile and brittle, can be totally penetrated with a coating of polymer on all pore surfaces. This takes full advantage of the foil's high surface area, strengthens it, and reduces the tendency for the foil and its oxide coating to powder. Local stress relief can be provided by applying the polymer electrolyte to the foil in a succession of passes, with the polymer in the successive layers being of progressively increased molecular weight.

BRIEF DESCRIPTION OF DRAWINGS

The foregoing and other objects, characteristics and advantages of the present invention will be more clearly understood from the following detailed description thereof when read in conjunction with the accompanying drawings, in which:

FIG. 1 is a diagrammatic fragmentary cross-sectional view of the basic laminate structure of the components of a solid electrolyte capacitor according to one embodiment of the present invention;

FIG. 1A is a diagrammatic fragmentary cross-sectional view, similar to FIG. 1, of the laminate structure of the components of a solid electrolyte capacitor according to a slightly modified embodiment of the present invention;

FIG. 2 is a schematic illustration of a solid electrolyte capacitor the capacitance element of which is constituted by the laminate of FIG. 1 or FIG. 2 rolled up into the form of a cylindrical body;

FIG. 3 is a diagrammatic fragmentary section through a stack-type solid electrolyte capacitor according to a modified embodiment of the present invention, the view being taken along the line III—III in FIG. 4;

FIG. 4 is a plan view of the structure shown in FIG. 3, the view being taken along the line IV—IV in FIG. 3;

FIG. 5 is a diagrammatic fragmentary section through a solid electrolyte capacitor utilizing an anode constituted of a layer of solid electrolyte polymer-impregnated metallic particles according to a further modified embodiment of the present invention;

FIG. 6 is an enlarged detail view of the structure enclosed within the circle VI in FIG. 5;

FIG. 7 is a diagrammatic fragmentary section through a solid electrolyte double layer capacitor utilizing an anode constituted of a porous layer of electrolyte polymer-impregnated sintered carbon particles according to yet another modified embodiment of the present invention;

FIG. 8 is an enlarged detail view of the structure enclosed within the circle VIII in FIG. 7;

FIG. 9 is a diagrammatic fragmentary section through a solid electrolyte double layer capacitor similar to that shown in FIG. 7 but illustrating a somewhat different manner of forming the anode;

FIG. 10 is a diagrammatic fragmentary section through a solid electrolyte double layer capacitor similar to that shown in FIG. 9 but illustrating yet another manner of forming the anode;

MODES FOR CARRYING OUT THE INVENTION

Figure 1B:
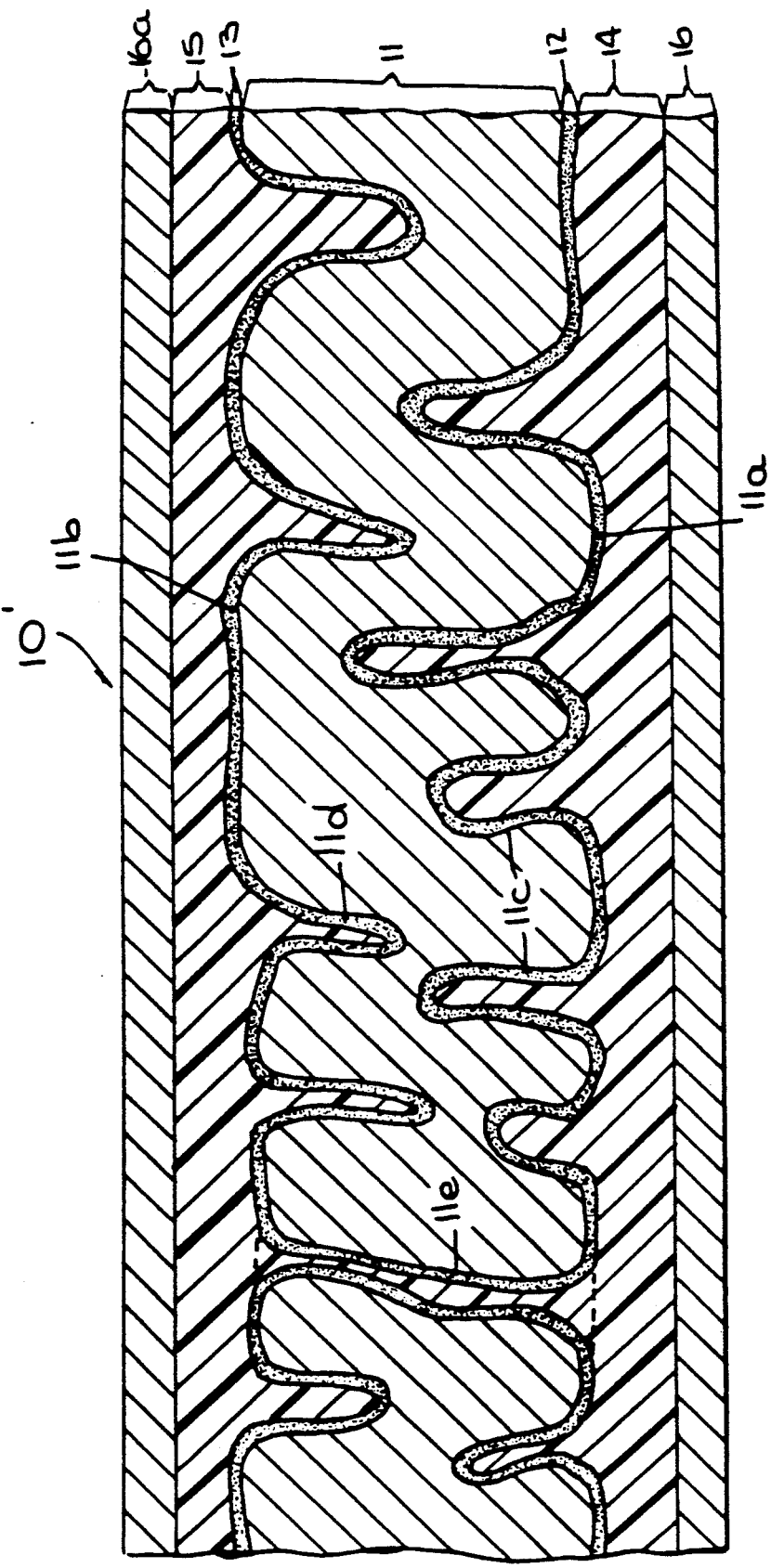
FIG. 1B is a view similar to FIG. 1A but is drawn to a greatly enlarged scale to provide a schematic illustration of the etching of the anode foil in a capacitor structure according to FIGS. 1 and 1A.

Referring to FIG. 1, there is shown in greatly exaggerated form the basic laminate or sandwich layer structure 10 which constitutes the capacitance element of a solid electrolyte capacitor embodying the fundamental principles of the present invention The laminate includes a highly etched foil 11 (the etching is not shown in this view) of a suitable anodic metal, preferably aluminum, to constitute the anode of the capacitor, the foil 11 having on both its opposite faces respective thin layers 12 and 13 of aluminum oxide (or the oxide of whatever other metal the foil 11 happens to be made of) to constitute the dielectric of the capacitor. Overlying the dielectric layers 12 and 13 and filling the etched in pores of the anodic foil 11 are respective ultrathin layers 14 and 15 of the solid electrolyte according to the present invention. Overlying the solid electrolyte layer 14 is a further foil or film 16, of a metal such as aluminum, silver, gold, platinum, nickel, or the like, to constitute the cathode of the capacitor.

In the preferred embodiment of the present invention, the solid electrolyte is in the form of an ultrathin layer not more than about 50 μ thick, and preferable not more than about 20 μ thick. The electrolyte is composed of a solid solution of a metal salt in a polymer of high solvation power, preferably a solid solution of an alkali metal salt of a dicarboxylic acid, e.g., potassium hexafluoroglutarate, in a blend of a siloxane-alkylene glycol copolymer with poly(ethylene oxide). The solid electrolyte layers 14 and 15 could in theory be separately prepared as foils and then bodily laminated to the dielectric-coated anodic foil 11. In practice, however, it is found that the handling of an ultrathin layer of polymer electrolyte in the form of a foil poses substantial difficulties. It is preferred, therefore, to form the layers 14 and 15 as films by depositing the polymer electrolyte a solution thereof in acetonitrile directly onto the surfaces of the anode foil and then curing the films. Within this concept the fluid polymer may be applied to each anode surface in several passes, with the polymer in each pass after the first having a somewhat higher molecular weight than the polymer in the last preceding pass. Thus, the film of lowest molecular weight would be applied first and thereafter the additional films of progressively higher molecular weight. This manner of progressively building up the final solid electrolyte layer ensures the complete coverage of the entire surface of even the most finely etched anode foil, since the solution of the polymer electrolyte is able to penetrate even into pores less than 0.025 μ wide, and provides appropriate stress relief to prevent powdering at the anode metal/oxide interface or fracturing of the anodic foil.

In essence, the application of the polymer electrolyte film may be effected in either of two ways. One of these entails utilizing for the various passes respective polymers which have different molecular weights prior to their polymerization; for example, a coating of an electrolyte-containing solution of polymerizable material of low molecular weight is applied to the bare oxidized surface of the anode foil in an amount sufficient to at least fill all the pores thereof, and the material is then polymerized, after which a second coating of an electrolyte-containing solution of polymerizable material of high molecular weight is applied to the hardened first coat, in an amount sufficient to bring the overall electrolyte layer thickness relative to the foil surface to the desired value, and followed by the polymerization of the second material. The other way entails utilizing for the various passes an electrolyte-containing solution of polymerizable material the respective quantities of which have been prepolymerized to different degrees and thus have correspondingly different molecular weights, with the less polymerized material being applied first.

Other methods of obtaining the same result may, of course, also be used. Merely by way of example, the anode foil may be coated with an electrolyte-containing solution of polymerizable material applied to the desired thickness in a single pass, which material is then provided with a degree of surface polymerization (e.g., by means of surface irradiation with ultraviolet light) which is greater than its bulk polymerization.

It will be understood that the choice of any particular one of these methods will in general depend on the ultimate design characteristics of the capacitor desired. Thus, the use of any particular degree of variation of the molecular weight of the polymer throughout the thickness of the solid electrolyte layer will enable the manufacturer to control the internal resistance of the capacitor relative to the strength of the electrolyte layer.

It will further be understood that a degree of control over the ultimate characteristics of the capacitor may also be achieved by an appropriate selection of the polymer components of the solid electrolyte. Thus, using only poly(ethylene oxide) by itself as the polymer component of the solid electrolyte would provide a layer having higher mechanical stability at high temperatures (90° C.), but such a layer would also have a high internal electrical resistance. On the other hand, utilizing only a siloxane copolymer as the polymer component of the solid electrolyte would provide a layer having a low internal electrical resistance, but such a layer would also have a relatively low strength at high temperatures (above 60° C.). A blend of these polymers would, of course, yield a layer in which these properties are modified correspondingly, and the particular composition chosen in any given case will have to be determined in light of the intended application for and use environment of the capacitor. Merely by way of example, however, it is believed that a 60%/40% blend of poly(ethylene oxide) and siloxane-alkylene glycol copolymer will provide optimal characteristics for most applications.

The cathode layer 16 may also be provided in the form of a separate foil suitable for lamination to the solid electrolyte layer 14. Alternatively, however, especially if the cathode thickness is to be minimized, the cathode layer may be formed in situ as a film by painting, sputtering, evaporating or otherwise depositing the metal onto the surface of the solid electrolyte layer. Merely by way of example, the cathode may be formed by applying to the hardened solid electrolyte layer a film of a polymer ink containing fine particles of a conductive metal such as silver or nickel in suspension, or the film of silver or other cathodic metal may be formed by sputtering, chemical deposition or vapor deposition of the metal onto the solid electrolyte surface. A further variant of the formation of the cathode will be more fully described hereinafter with reference to FIGS. 11, 11A and 11B.

The laminate 10' shown in FIG. 1A is essentially the same as that shown in FIG. 1 except for the additional provision of a second cathode layer 16a substantially identical to the cathode layer 16. The layer 16a is advantageously adapted to be connected electrically in parallel to layer 16 to decrease the internal resistance and also provide a small increase in capacitance. Further description of the structure shown in FIG. 1A, in which elements corresponding to those of FIG. 1 are identified by the same reference numerals, is not necessary.

FIG. 1B schematically illustrates the surface detail of the anode foil 11. Such foils are commercially available products and as such do not constitute a part of the invention. Accordingly, neither their actual structures (both micro and macro) nor the methods of production thereof are described herein. It is deemed sufficient to point out that the foil is annealed, and the opposite surfaces 11a and 11b of the foil 11 are deeply and finely etched to provide a multiplicity of microscopic pores or depressions 11c and 11d in the respective surfaces. As indicated in FIG. 1B, some of these pores are deeper and/or wider than other pores and, as represented at 11e, it is actually preferred that at least some of the pores extend through the entire thickness of the foil. FIG. 1B also shows that the dielectric oxide layers 12 and 13 coat the respective surfaces of the foil 11 each throughout its entire expanse, including over the entire depths of the various pores. It should be understood, of course, that the illustration of the laminate in FIG. 1B is not intended to indicate precisely the forms and configurations of the etching in the anode foil 11.

As previously mentioned, the provision of the pores or depressions 11c, 11d and 11e not only maximizes the available surface area of the foil but also enables the solid polymer electrolyte, when the same is being applied in solution to the opposite surfaces of the foil to form the electrolyte layers 14 and 15, to penetrate into the pores. As a result, a degree of mechanical interlocking of the electrolyte layers with the anode foil 11 is provided as well as a degree of stress relief through which a deterioration of the oxide coatings 12 and 13 at the interfaces thereof with the metal surfaces 11a and 11b of the foil and a possible fracturing of the latter are inhibited.

Referring now to FIG. 2, the electrolytic capacitor 17 there shown, the design of which is such as to render the capacitor suited for use in a pacemaker or defibrillator, utilizes as its capacitive element a laminate such as that designated 10 in FIG. 1 or preferably that designated 10' in FIG. 1A. To this end, the laminate, with suitable leads 18 and 19 appropriately secured to the anode and cathode foils or films 11 and 16/16a, respectively, is wound onto a thin, e.g., 3 mm diameter, cardboard core tube 20 into the form of a compact, substantially cylindrical body 21. The entire assembly is inserted into a cylindrical housing 22 of aluminum, titanium, or like inert stable metal, with the exterior surface of the cylindrical body 21 being insulated from the housing by an interposed insulating spacer 23. Housing 22, which is closed at its bottom end 22a, is sealed at its top end 22b in any appropriate manner, such as, for example, by means of an end plate 24 which is secured in place by crimping or rolling of the metal housing or by being brazed thereto. Suitable openings (not shown) are provided in the plate 24 through which the leads 18 and 19 pass with an insulative hermetic seal. For purposes of moisture control, i.e., to minimize the likelihood of electrolytic attack on the oxide dielectric layers in the event of the presence of some residual quantities of moisture in the housing and particularly in the electrolyte layers, it is preferred to enclose a quantity of a suitable desiccant (not shown), such as silica gel, phosphorous pentoxide, or the like, in the core tube 20.

Referring to FIGS. 3 and 4, the capacitor 25 there illustrated includes a plurality of capacitive units 26 in a stacked arrangement (two are shown but there could be more). Each unit 26 includes an anode foil 27 deeply etched to provide maximum surface areas and coated on both its faces with respective ultrathin solid electrolyte layers 28 and 29, and a respective cathode foil or film 30 overlying the face of the associated electrolyte layer 28 directed away from the associated anode 27. As in the previously described embodiments of the present invention, the cathodes may be in the form of foils or films. In effect, therefore, the anodes and cathodes are interleaved, with the edges of the anodes not being adjacent the edges of the cathodes to reduce the field strength at the edges of the anodes and minimize the chance of an electrical breakdown. Suitable means are provided for connecting the anodes 27 and cathodes 30 to respective sources of positive and negative potential; in the illustrated embodiment, these means are in the form of pairs of metallic ribbons 31-32 and 33-34 which are secured to their respective electrode elements, for example, by being spot welded or riveted thereto as schematically indicated at 35 and 36. Each of the two stacks of ribbons, which at the same time serves to maintain the desired spacings between the corresponding capacitor electrodes, is provided with a suitable lead 37 or 38 which extends out of the housing 39 of the capacitor for connection to an associated power source (not shown). To further minimize the creation of excessive electric field concentrations, the solid electrolyte layers 28 and 29 of each unit are extended around the edges of the associated intermediate anode foil 27 and, as shown at 40, the amount of the polymer electrolyte juxtaposed to the edge of each anode foil is somewhat increased in thickness to approximately twice the thickness of the layers 28 and 29 by, for example, dipping of the coated anode into uncured electrolyte.

In accordance with the embodiment of the invention illustrated in FIGS. 5 and 6, the capacitor laminate structure 40 there shown includes an anode 41 which is constituted, in the preferred form of this embodiment, of a mass of deeply etched aluminum flakes 42 disposed in a layer formation and embedded in a matrix of polymeric material 43. The layer of flakes is covered over its entire expanse with an aluminum oxide dielectric layer, not shown in FIG. 5 but designated 44 in FIG. 6 where it is also indicated at 42a that at areas of contact between adjacent ones of the flakes the latter are not oxide coated to establish a continuous electrical contact between the flakes throughout the mass. The loading of the flakes 42 in the polymer 43 at a density of approximately 50% by volume is sufficient to ensure that flake to flake contact exists and that at least a portion of the mass of flakes is exposed at one surface of the polymer matrix 43, as indicated at 43a in FIG. 5, to enable an anode connector lead 45 to be electrically connected to the anode. When a metal oxide forming lead 45 is used, no gap 43a is required. Superimposed over the anode-constituting mass of flakes 42 is an ultrathin layer 46 of solid electrolyte according to the present invention, to the free surface of which is secured the usual cathode foil or film 47 as previously described.

Polymer matrix 43 may be constituted of the same polymer electrolyte as the layer 46. Both the polymer matrix for the mass of particles and the solid electrolyte layer may be formed in one operation, with the quantity of polymer electrolyte used being in excess of that needed to impregnate the mass of flakes by an amount sufficient to form the desired thickness of the electrolyte layer. If the polymer matrix 43 and the layer 46 are formed separately, the latter may be built up in several passes of electrolyte-containing solution of polymerizable material having different molecular weights as previously described. Although the anode layer 41 has been described as constituted of a mass of aluminum flakes, it may be composed of a mass of other types of particles, e.g., powder granules, microspheres, and the like, and these may be made of anodic metals other than aluminum.

In accordance with yet another embodiment of the present invention, there is shown in FIGS. 7 and 8 a solid electrolyte capacitor laminate structure 48 having an anode 49, a cathode film or foil 50 and an intermediate solid electrolyte layer 51. The anode of the capacitor in this embodiment of the invention is constituted of a mass of mutually contacting electrically conductive carbon particles embedded in a 2-layer polymer matrix, the layer 52 containing the anodic carbon particles 53 being composed of the solid electrolyte according to the present invention and the layer 54 containing the carbon particles 55 being composed of a nonelectrolytic polymer insulating compound. Positive potential is applied to the anode particles 53 via a connector lead 56, e.g., a foil or wire, which is electrically connected to at least some of the carbon particles 55 exposed at the free surface of the layer 54. The nonelectrolytic polymer layer 54 ensures that the anode connector 56 is not in direct electrical contact with the solid electrolyte. Preferably the carbon particles in the anode layer 49 occupy about 50% by volume of the total layer No carbon particles are present in the ultrathin layer 51 of solid electrolyte between the cathode and the anode.

Anodic layer 52 may be formed independently of the solid electrolyte layer 51, with the latter being formed in one or more passes as described above Alternatively, it is possible to form both the particle-filled layer 52 and the particle-free solid electrolyte layer 51 in one operation, with the quantity of the polymer electrolyte material used being in excess of the amount required to impregnate the mass of carbon particles 53 by the amount required to form the layer 51.

Referring to FIG. 9, the capacitor laminate structure 57 there shown includes an anode layer 58, an ultrathin solid electrolyte layer 59 according to the present invention, and a cathode foil or film 60. The anode of the capacitor in this embodiment of the invention is constituted of a 50% by volume porous body 61 of sintered carbon particles. A certain portion of the sintered carbon body is impregnated with the solid electrolyte according to the present invention, the impregnation being controlled, however, to ensure that a thin region 61a of the sintered carbon body, to the free face of which the anode connector lead, i.e., the foil or wire 62, is connected, remains free of the solid electrolyte. The impregnation of the sintered carbon body 61 is accompanied by application of the ultrathin solid electrolyte layer 59 to the opposite face of the anode 58, with the layer 59 being formed either by an excess of the material impregnated into the carbon body or by a quantity of the polymer electrolyte applied separately in one or more passes in the manner previously described herein.

In accordance with yet another embodiment of the present invention, the capacitor laminate structure 63 shown in FIG. 10 differs from that of FIG. 9 in that it includes an anode layer 64 a part of which is composed of a porous body 65 of sintered carbon particles impregnated with solid electrolyte according to the present invention and another part of which is composed of a body 66 of nonporous carbon interposed between the porous body and the anode connector lead 67. The other components of the laminate, i.e., the solid electrolyte layer 68 and the cathode foil or film 69, as well as the manner of impregnation of the porous carbon body 65 and the manner of formation of the layer 68, are the same as before.

As noted above, the double layer capacitors of FIGS. 7-10 are generally of very high capacitance per unit volume, but have low voltage ratings, and are thus particularly suitable for use as computer memory backup.

Figure 11:
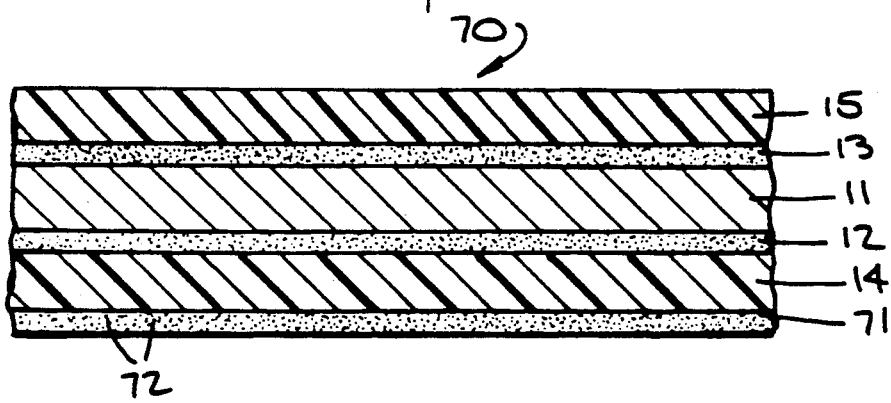
FIGS. 11, 11A and 11B are diagrammatic fragmentary cross-sectional views of the basic solid electrolyte capacitor laminate structure utilizing a novel cathode construction according to still another embodiment of the present invention.

As previously mentioned, the present invention also contemplates the formation of the cathode of the capacitor in a novel way by utilizing a mass of electrically conductive carbon particles. One variant of this aspect of the invention is illustrated schematically in FIG. 11, which shows a laminate 70 basically similar to the laminate 10 shown in FIG. 1 and including an anode 11, a pair of oxide dielectric layers 12 and 13 thereon, a pair of solid electrolyte layers 14 and 15 over the oxide layers, and a cathode. The latter, which is designated 71 in FIG. 11, is, however, constituted of a layer of electrically conductive carbon particles 72 in electrical contact with each other. The cathode 71 preferably is formed by depositing (e.g., by painting) onto that surface of the solid electrolyte layer 14 which is directed away from the anode a coat of a suitable liquid carrier having the particles 72 dispersed therein and by thereafter drying, evaporating or otherwise solidifying the carrier.

Figure 11A:
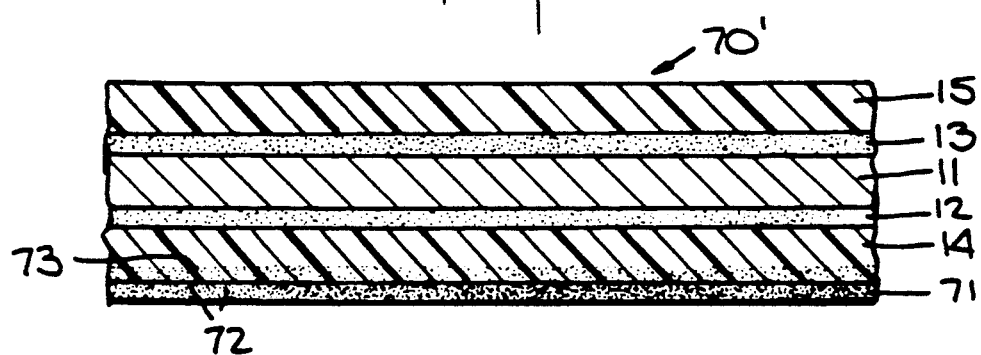

Another variant of this aspect of the invention is schematically illustrated in FIG. 11A. The laminate 70' there shown is essentially identical to that shown in FIG. 11 except that it has a mass of carbon particles 73 in a layer formation dispersed in the immediate subsurface region of the solid electrolyte layer 14 at a loading of somewhat less than 50%. Here the particles 73 do not constitute a part of the cathode, however, and except in random occurrences are not in electrical contact with each other. Rather, they are incorporated in the electrolyte layer only to reduce the internal impedance thereof. It will be understood that the layer formation of the particles 73 can be formed in various ways; for example, this can be done by dispersing the particles in a quantity of the uncured electrolyte polymer solution and then applying the latter in a second (or subsequent) pass to the particle-free cured portion of the layer 14 formed in the first (or prior) pass, following which the particle-containing polymer is cured, or by printing an ink or liquid carrier containing the particles onto the still uncured layer of polymer electrolyte so that the particles can migrate to the desired extent into the subsurface region of the layer before the same is cured. In either case, of course, the cathode-constituting layer 71 of particles 72 is applied to the solid electrolyte after the above-described incorporation therein of the particles 73 has been completed.

Figure 11B:
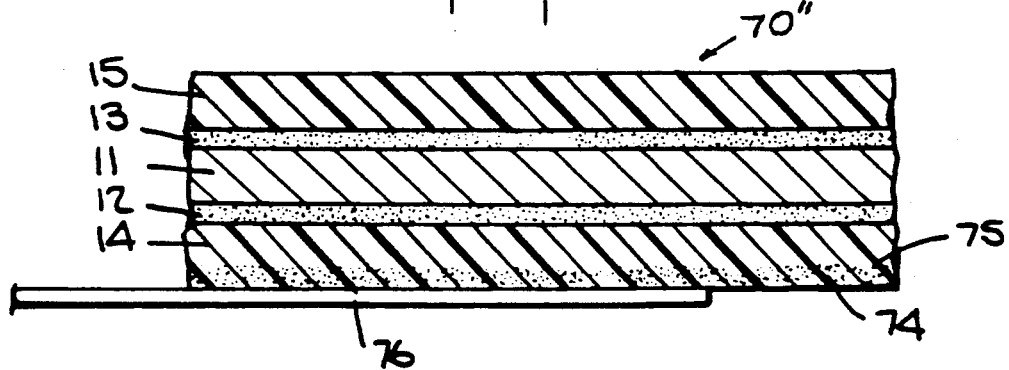

Yet another variant of this aspect of the invention is schematically illustrated in FIG. 11B. The laminate 70" there shown differs from those of FIGS. 11 and 11A only in that it has no cathode-forming layer of carbon particles external to the solid electrolyte layer 14. Rather, the cathode 74 is constituted of a mass of carbon particles 75 incorporated in a layer formation in the immediate subsurface region of the solid electrolyte layer 14 at a loading of at least, and preferably somewhat greater than, 50% so that the particles are in electrical contact with each other throughout the layer formation and simulate a solid conductor The particles 75 in the cathode 74 must, of course, be capable of being connected to a suitable cathode lead 76, for example, by virtue of projecting slightly from the surface of the solid electrolyte layer 14 or otherwise. The manner of forming the cathode 74 is essentially the same as the manner in which the impedance-reducing layer formation of the particles 73 is formed and thus need not be described again at this point.

The manufacture of solid electrolyte capacitors embodying the principles of the present invention is further explained by the following examples.

EXAMPLE 1

An anode made from a 1 cm $\times$ 1 cm piece of aluminum foil, 100 $\mu$ thick and etched with holes 1-2 $\mu$ in diameter, has an anode connection spot welded at one edge. The surface of the foil is anodized, and the foil is then impregnated with a polymer electrolyte comprising potassium hexafluoroglutarate dissolved in a blend of 50% poly(ethylene oxide) $3 \times 10^5$ gmol$^{-1}$, 40% poly(methylmethoxy[poly(ethylene glycol) 350 daltons siloxane]) and 10% styrene, with the salt being present at a concentration of 0.04 moles of salt per mole of ethylene oxide repeat unit. After the polymer has been cured and the surface crosslinked, a coating of silver paint is applied to the resultant solid electrolyte film to form the cathode. Connection to the cathode is by a sliver of foil 0.5 cm $\times$ 1 cm, rolled and welded to the cathode lead. The entire assembly is then exposed to a humid environment controlled by silica gel, and the aluminum oxide coating to constitute the dielectric is formed by applying 400 volts between the anode and cathode for 24 hours. The final assembly is oven dried at 60° C. for 24 hours under vacuum and then encapsulated in a coat of epoxy resin. The resulting capacitor construction is suited for use as a high voltage, printed circuit board-mounted capacitor and has a capacitance of about 0.87 $\mu$F, a voltage rating of about 380 volts, and an impulse current rating of 0.5 amp.

EXAMPLE 2

A capacitor is constructed as in Example 1 but the oven drying step is omitted, leaving a small quantity of moisture absorbed in the polymer electrolyte. Such a capacitor will have an enhanced oxide layer re-forming capability.

EXAMPLE 3

An anode is constructed from one piece of highly etched aluminum foil (10 cm $\times$ 44 cm $\times$ 75 $\mu$) . The etched pores in the foil are between 1 and 2 $\mu$ in diameter and penetrate the thickness of the foil. The anode lead is connected to the foil by a series of rivets. The anode foil is impregnated with the same electrolyte salt/polymer blend as in Example 1. After the polymer has been cured and the surface of the resultant solid electrolyte film crosslinked a coating of silver paint is applied to the film to form the cathode. Connection to the cathode is by a piece of unetched foil 0.5 cm × 10 cm, rolled and welded to the cathode lead. The assembly is then exposed to a silica gel controlled humid environment and wound onto a 3 mm diameter cardboard tube. The assembly is then encapsulated in an aluminum tube with a rolled end seal, typical of the style found in photo flash capacitors. The dielectric is formed by applying 400 volts to the anode and cathode for 24 hours while the assembly is exposed to a controlled humidity at 25° C. Finally the end seal is closed. The resultant device has a discharge capacitance of about 400 μF, a rated voltage of about 390 volts, and an impulse current rating of 200 amps.

EXAMPLE 4

Ten sheets of aluminum foil (10 cm × 10 cm × 50 μ), with aluminum ribbon spot welded at one edge, are prepared as anodes as in the preceding example. These sheets are saturated with the same polymer electrolyte as before but containing no styrene, with a double coat being provided at the edge of each sheet. After curing, but without cross-linking of the surface of the solid electrolyte films, the sheets are stacked and interspersed with cathodic conducting foils (10 cm × 9 cm × 10 μ), so that the edges of the anode and cathode foils are not adjacent. The dielectric oxide is formed as detailed in the previous examples, and the whole assembly is encapsulated in a box container. This type of assembly optimizes current capability by use of cathode foil rather than conductive paint (the former having a higher conductivity than the latter) and by omitting the crosslinking step which is not necessary for this construction because a multi-layer stacked film capacitor, being a flat layered structure, has adequate mechanical strength.

EXAMPLE 5

Flakes of etched formed aluminum anode material are mixed with the previously described polymer blend in a proportion of greater than 45% v/v. The mixture is spread as a thin film (10 cm × 10 cm × 100 μ), a 10 cm aluminum wire lead is placed along the diagonal of the square, and the whole assembly is cured. The metal flake-impregnated polymer is then coated with a layer of electrolyte polymer about 10 μ thick and the polymer cured. Sheets of this material are then interspersed with sheets of cathodic foil to produce a simply assembled capacitor. The whole assembly is subjected to the dielectric forming procedure described for the previous examples. The finished assembly forms a capacitor of about 200 μF and rated at about 350 volts. This form of construction is suitable where ease of assembly is the prime objective.

EXAMPLE 6

A high surface area carbon anode 10 cm × 5 cm × 100 μ in size is coated with a layer of the solid electrolyte of Example 1, the layer being 10–50 μ thick. A gold foil cathode 10 cm × 5 cm × 10 μ in size is then applied to the electrolyte layer. The resultant device constitutes a double layer capacitor having a capacitance of 50 mF and rated for ±5 volts.

CROSSLINKING

The optimum polymer mixture described herein is a mixture of poly(ethyleneoxide) and a siloxane polyethyleneoxide copolymer. Such mixtures relied on the crystallinity of the polyethyleneoxide component to provide the solid-like mechanical properties to the material. However such an approach to preparing a solid polymer electrolyte has two disadvantages: first, the material becomes a highly viscous fluid above its melting point; and second the presence of crystallinity in the solid polymer electrolyte lowers the conductivity of the material. The above described methods of solving the former problem included incorporating a crosslinkable substance such as styrene in the electrolyte and crosslinking the material after application.

In accordance with the invention there are alternative methods of crosslinking the polymer electrolyte material so that an elastomeric substance is obtained which contains no crystallinity and which therefore has improved conductivity and no temperature limit except that at which the material begins to decompose.

A number of methods exist for crosslinking solid polymer electrolytes based on the alkyleneoxide —(CH$_2$CHRO)— repeat unit. These include using mono-, di-, tri- and/or poly functional hydroxy compounds based on the alkyleneoxide repeat unit and crosslinking these using a diisocyanate to produce a polyurethane elastomer. Examples of such hydroxy terminated alkyleneoxide based compounds include:

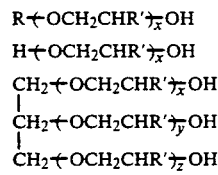

where R and R' may be H or an alkyl group. In these compounds the overall molecular weight can be as high as is consistent with the substance not crystallizing in the cured elastomer. The isocyanate component of the polyurethane may be any of the standard di- or polyfunctionl isocynates used in polyurethane elastomer manufacture including hexamethylene diisocyanate, toluenediisocyanate and methyl diphenylisocyanate.

Alternatively it is possible to use vinyl, allyl, acrylic, alkacrylic or other unsaturated functional group terminated compounds based on the alkyleneoxide repeat unit and crosslinking these by including a small quantity of some multifunctional unsaturated compound and free radical, ionic or radiation induced initiation. The multifunctional reagent in these cases can be the divinyl, diallyl, diacrylic, dialkacrylic, etc. analogue of the main alkyleneoxide based substance to be crosslinked. Examples of such unsaturated functional group terminated alkylene oxide based compounds include:

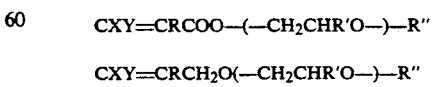

where X,Y,R and R' are H or alkyl groups and R" is H, an alkyl group, or in the case of the difunctional compounds, some unsaturated functional group.

Other methods of crosslinking mono-, di- and trihydroxy alkyleneoxide based compounds include the formation of polyesters via reaction with di- or multifunctional acids, the formation of polyamides via the reaction with di- or multifunctional amines and the reaction of vinyl, allyl, acrylic or alkacrylic terminated compounds with poly(alkylhydrogensiloxane) to produce a siloxane poly(alkyleneoxide) copolymer.

In all of these methods of crosslinking the solid polymer electrolyte attention must be paid to the effect of the crosslinking materials and reaction on the conductivity of the resultant cured solid polymer electrolyte. In general it is highly desirable to have the content of oxyalkylene groups as high as possible in the cured solid polymer electrolyte and the individual oxyalkylene polymer chain lengths should be as long as possible consistent with there being no tendency for the chains to crystallize in the cured solid polymer electrolyte. For these reasons the crosslinked materials described below are different from the elastomeric materials which are produced using similar curing reactions in non-capacitor applications. It is notable that such materials would rarely have sufficient ion solvation power to produce a solid polymer electrolyte of usefully high conductivity.

In ethylene oxide based polymers, crystallization of the polymer chains can be suppressed by the inclusion on the polymer backbone of some large pendant group at frequent intervals. The pendant group operates to disrupt the crystal packing. There are many pendant groups which will suffice. Random copolymers of ethylene oxide and propylene oxide represent good examples of this effect wherein between 6% and 100% of the repeat units in the polymer chain are propylene oxide groups. The inclusion of the propylene oxide repeat units is sufficient to cause the depression of the melting point to a degree that crystallization takes place only with great difficulty. Such random ethylene oxide - propylene oxide copolymers are available at various molecular weights from Imperial Chemical Industries Pty. Ltd. under the trade name Daltolac.

Further improvement in the conductivity of the elastomeric materials which are the subject of this invention can be achieved by the inclusion in the material of a liquid plasticizer. The plasticizer must be compatible with the polymer matrix and must also be a good solvent for the salt being employed. A range of plasticizers commonly used in the plastics and rubber industries are suitable, as will be understood by those skilled in the art. Of particular utility are the low molecular weight liquid alkylene oxide oligomers and polymers. However, it is important to ensure that the end groups of these molecules are not hydroxy or amino groups in order that they are not reacted in the polymer network. For this reason, it is optimal to block the end groups via substitution of alkyl ethers, alkyl urethanes and/or esters. In certain applications sufficient plasticizer may be added to cause the material to become gel-like.

Of the crosslinking methods outlined above, the first two, namely the production of a urethane crosslink and the production of saturated hydrocarbon crosslinks, are optimum for use in solid polymer electrolyte based electrolytic capacitors since neither produces volatile byproducts and both reactions can be caused to take place at moderate temperatures on the addition of a catalyst. On the other hand the formation of ester and amide linkages invariably involves the production of a volatile byproduct which must be removed if the reaction is to go to 100% completion. In the following description attention is focused primarily on the urethane based crosslinking method. However, it should be understood that the other methods of producing the crosslinked solid polymer electrolyte material are equally useful in this application when optimal compositions and processes are established.

A critical part of the formulation of the solid polymer electrolytes is the nature and concentration of the dissolved salt. Suitable salts, identified above, include the alkali metal, alkali earth, transition metal, ammonium, organic ammonium, zinc cadmium, mercury and thallium salts of acids selected from the group consisting of monobasic, dibasic and tribasic acids other than the haloid acids. The choice of salt depends on the properties desired of the electrolyte. For example, where high aluminium electrolytic capacitor shelf life is required, a suitable salt has been found to be $NaBF_4$. On the other hand, where electrical series resistance is relatively more important than shelf life, a number of other salts can be employed, including KSCN.

The urethane crosslinked elastomers of the polyalkylene oxides can be produced in a variety of forms depending on the nature of the starting materials used. A highly crosslinked material is desirable for the electrolyte coating to be applied to the cathode, as described below, in order to provide sufficient strength to maintain electrical separation of the anode and cathode foils. Such a hard elastomeric solid polymer electrolyte suitable for use as an aluminium capacitor cathode coating is produced by dissolving $NaBF_4$ in a mixture of 100 g of poly(ethyleneglycol) triol (600 daltons), 66 g of the poly(ethyleneglycol) triol (1000 daltons) (denoted as structure I),

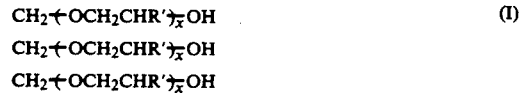
(I)

(where in this case $R'=H$) and then crosslinking with 40 g of hexamethylene diisocyanate. The mixture is cured either by maintaining at approximately 60°0 C. for 12 hours or by adding a catalyst.

The salt content typically lies in the region of $R=10$ to 50 where the concentration unit R is calculated by dividing the number of moles of oxyalkylene oxygens (or sulphurs in the case of polymers containing thioalkylene repeat units) by the number of moles of salt in the mixture. These elastomeric materials also may be prepared in the absence of a dissolved salt.

This mixture can be easily coated onto the surface of aluminium cathode foils prior to curing. Once cured, the electrolyte is then found to be permanently bound to the cathode material. This has a number of advantages:
 i) the electrolyte cannot flow off the foil,
 ii) the elastomer provides stress relief to the foil and thus the foil/electrolyte composite has a higher strength than the foil alone. This improves the handling of the foil and enables thinner cathode foils to be employed, resulting in both higher volumetric efficiency and lower weight.
 iii) the cathode composite can be prepared separately from the capacitor rolling step during production.

Softer, and more conductive elastomeric materials suitable for penetration and operation inside the porous structure of highly etched aluminium anodes can be prepared by increasing the ratio of poly(ethyleneglycol) (600 daltons) to the poly(ethyleneglycol) triol in the above mixture and adjusting the amount of hexamethylene diisocyanate accordingly or by increasing the glycol and triol chain length, to the extent possible such that the rubber material cannot crystallize, or by using a mixture of triol and monool as follows. A mixture of NaBF$_4$, 137 g of poly(ethyleneglycol) triol (1000 daltons), 100 g of methoxy poly(ethyleneglycol) (550 daltons) and 50 g of hexamethylene diisocyanate is reacted either at elevated temperatures or on the addition of a catalyst. The salt content typically lies in the region of R=10 to 50. The product is a clear soft elastomeric material having high conductivity and low degradative reaction on the aluminium anode.

These elastomeric materials can be prepared either in the absence of a dissolved salt or if a salt is desired it is added to the mixture of poly(alkyleneoxides) and dissolved therein prior to addition of the diisocyanate.

This mixture can be impregnated into the porous structure of highly etched aluminium anode foils prior to curing. Once cured the electrolyte is then found to be permanently bound to the anode material. This has a number of advantages:

i) the electrolyte cannot flow off the anode foil, ii) the elastomer provides stress relief to the anode foil and thus the foil/electrolyte composite has a higher strength than the foil alone.

iii) the anode composite can be prepared separately from the capacitor rolling step during production.

EXAMPLE 7

Figure 12:
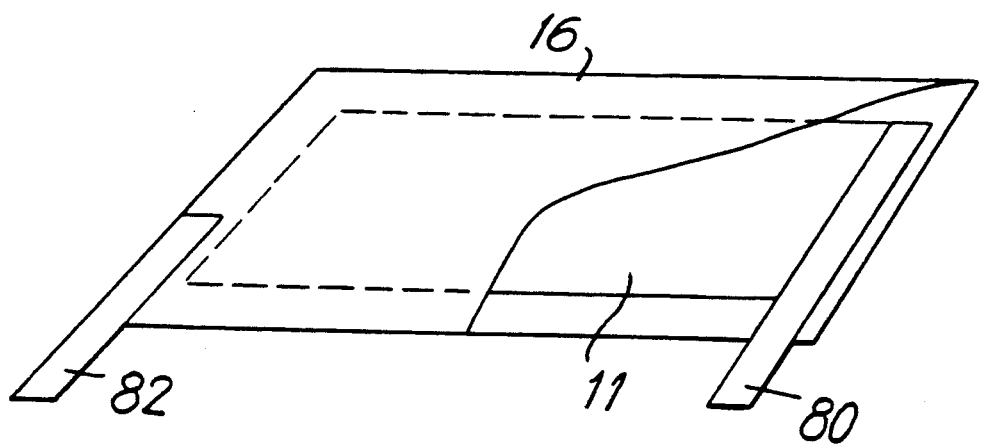
FIG. 12 is a partially cut away, perspective view of an assembly used to produce yet another embodiment of the invention.

Referring to FIG. 12, a piece of aluminium cathode foil 16 having a length of 22 cm and a width of 6.5 cm is coated with a mixture containing 44% poly(ethyleneglycol) (600 daltons), 29% poly(ethyleneglycol triol) (1000 daltons), 7% NaBF$_4$ and 20% hexamethylenediisocyanate. Before application, the salt is dissolved in the glycols and this mixture dried at 60° C. for 24 hours. On addition of the hexamethylenediisocyanate, a catalyst such as Thorcat may also be added to accelerate the curing of the polyurathane at room temperature. After coating, the foil is cured and dried over silica gel at 60° C. under vacuum. The resultant coating is a clear tough continuous film of polyurethane rubber. The coating thickness obtained on the aluminum is typically 10–20 μm. In a low humidity environment, a piece of aluminium anode foil 11 having a length of 10 cm, a width of 5.3 cm and having secured to one end a connector 80 in the form of a conductive tab 4 mm wide by 8 cm long is then impregnated with a mixture containing 33% methoxypoly(ethyleneglycol) (550 daltons), 44% poly(ethyleneglycol triol) (1000 daltons), 7% NaBF$_4$ and 16% hexamethylenediisocyanate. Before impregnation the salt is dissolved in the glycols and this mixture dried at 60° C. for 24 hours. On addition of the hexamethylenediioscyanate, a catalyst such as Thorcat may also be added to accelerate the curing of the polyurethane at room temperature. Before the polyurethane has cured, the liquid impregnated anode 11 is enfolded within the coated cathode 16 as illustrated in FIG. 12 and the excess liquid polymer is expelled by rolling. A connector 82, also in the form of a conductive tab is secured to an uncoated surface of cathode foil 16. Once cured, the capacitor is formed to full rated surge voltage over a period of 24 hours, aged at 60° C. for 24 hours and then re-formed.

EXAMPLE 8

In this example the procedure and chemical components are as in Example 7 except that the cathode coating mixture does not contain the salt component. This produces a cathode coating which, once cured, is less susceptible to uptake of moisture and therefore has less tendency to become tacky. Such a composition is suitable where wound rolls of foil are required not to have high surface adhesion.

EXAMPLE 9

Aluminium cathode foil in wound roll form 6.5 cm wide is coated with a mixture containing 44 parts poly(ethyleneglycol) (600 daltons), 29 parts poly(ethyleneglycol triol) (1000 daltons) and 20 parts hexamethylenedisocyanate. Before application the mixture is dried at 60° C. for 24 hours. The coating mixture is sprayed or rolled onto both sides of the continuous ribbon of foil and cured by passing the ribbon through a curing oven maintained at 60° C. After curing, the foil is wound onto a second drum. The resultant coating is a clear, tough, continuous film of polyurethane rubber. The coating thickness obtained on the aluminum is typically 10–20 μm.

In a low humidity environment, a ribbon aluminium anode foil 5.3 cm wide and having secured at regular intervals a connector tab 4 mm wide by 8 cm long is then impregnated with a mixture containing 33% methoxypoly(ethyleneglycol) (550 daltons), 44% poly(ethyleneglycol triol) (1000 daltons), 7% NaBF$_4$ and 16% hexamethylenediisocyanate. Before impregnation the salt is dissolved in the glycols and this mixture dried at 60° C. for 24 hours. The ribbon is impregnated by passing it slowly through a bath of the electrolyte mixture. Before the polyurathane has cured the liquid impregnated anode is compound with a ribbon of coated cathode foil onto a former 4 mm in diameter. When the required length of ribbon has been wound onto the former the ribbon is cut, the wound capacitor removed and winding is restarted on a new former. The excess polymer liquid is expelled by a pressure roller acting on the former. The wound capacitors are cured by placing in an oven at 70° C. for 24 hours. Once cured the capacitor is formed to full rated surge voltage over a period of 24 hours, aged at 60° C. for 24 hours and reformed to full rated surge voltage.

EXAMPLE 10

A double anode wound capacitor is produced as in Example 9 by passing two anode ribbons continuously through the impregnating bath and cowinding both anodes and a single cathode foil onto the former. Such a procedure produces a further reduction in capacitor volume per unit energy.

EXAMPLE 11

A capacitor having optimum low electrical series resistance is produced using the method of Example 7 wherein the salt is replaced by KSCN. A piece of aluminium cathode foil 22 cm long by 6.5 cm wide is coated with a mixture containing 44 parts poly(ethyleneglycol) (600 daltons), 29 parts poly(ethyleneglycol triol) (1000 daltons), 6.2 parts KSCN and 20 parts hexamethylenediisocyanate. Before application, the salt is dissolved in the glycols and this mixture is dried at 60° C. for 24 hours. On addition of the hexamethylenediisocyanate a catalyst such as Thorcat may also be added to accelerate the curing of the polyurethane at room temperature. After coating, the foil is cured and dried over silica gel at 60° C. under vacuum. The resultant coating is a clear tough continuous film of polyurethane rubber.

The coating thickness obtained on the aluminum is typically 10-20 μm. In a low humidity environment, a piece of aluminium anode foil 10 cm long by 5.3 cm wide and having secured to one end a connector tab 4 mm wide by 8 cm long is then impregnated with a mixture containing 33 parts methoxypoly(ethyleneglycol) (550 daltons), 44 parts poly(ethyleneglycol triol) (1000 daltons), 6.2 parts KSCN and 16 parts hexamethylenediisocyanate. Before impregnation the salt is dissolved in the glycols and this mixture dried at 60° C. for 24 hours. On addition of the hexamethylenediisocyanate a catalyst such as Thorcat may also be added to accelerate the curing of the polyurathane at room temperature. Before the polyurethane has cured, the liquid impregnated anode is enfolded within the coated cathode as indicated in FIG. 12 and the excess liquid polymer expelled by rolling. Once cured, the capacitor is formed to full rated surge voltage over a period of 24 hours, aged at 60° C. for 24 hours and then re-formed.

EXAMPLE 12

A rolled capacitor having optimum, low electrical series resistance is produced as in the method of Example 9 wherein the salt is replaced by KSCN.

EXAMPLE 13

In this example the procedure is as in example 7 with the chemical compositions of the cathode and anode as follows: The cathode mix contains 7.8% poly(ethyleneglycol monomethyl ether) (550 daltons), 78.4% Daltocel 34AI (ICI) (5000 daltons), 8.6% $NaBF_4$ and 5.2% hexamethylenediisocyanate. The anode mixture contains 33% poly(ethyleneglycol monomethly ether) (550 daltons), 33.7% Daltocel 34AI (ICI) (5000 Daltons), 51.9% tetraethyleneglycol dimethyl ether, 8.9% $NaBF_4$ and 2.2% hexamethylenediisocyanate.

Figure 13:
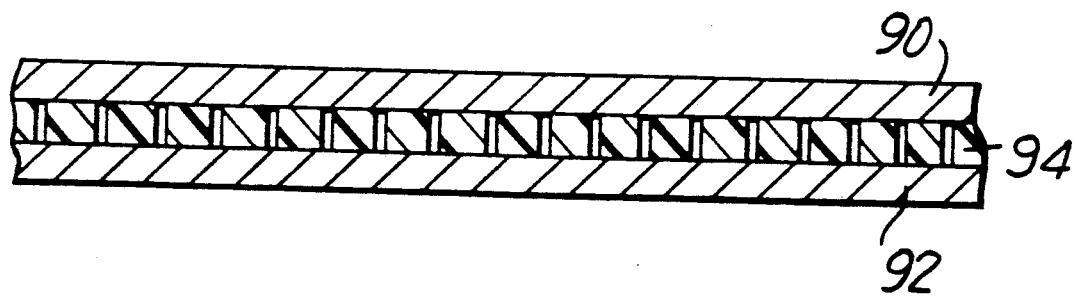
FIG. 13 is a simplified cross-sectional view of yet another embodiment of the invention.

Referring to FIG. 13, in accordance with yet another variation of the invention, an anode foil 90 and a cathode foil 92 may be assembled with an ultrathin spacer 94 used to maintain separation between the foils. The spacer must be less than 25 μ thick and be of an open weave construction having, for example, openings occupying more than twenty per cent by volume, and in a preferred embodiment, approximately forty percent by volume of the spacer material. An example of such a material is microporous isotactic polypropylene available from Hoechst Celenese Corporation and called Celgard ® 2500.

The spacer 94 is cowound with the foils 90 and 92. The resulting assembly is impregnated with an electrolyte according to the invention. The polymer is then cured. Suitable electrical conductors (leads) are attached to the foils, and the entire assembly is dip coated with an appropriate insulating material which is cured to become a comfornal capacitor housing with leads extending therefrom, as is well known in the art. Advantages of this construction are ease of manufacture and low electrical series resistance.

EXAMPLE 14

In this example, the procedure and chemical compositions are as in Example 13 except that the cathode coating is omitted and instead a microporous spacer (Celgard ® 2500) is inserted between the cathode anode foils.

Although the invention has been described with reference to particular embodiments and examples, it is to be understood that these embodiments and examples are merely illustrative of the principles of the invention. Numerous modifications may be made therein without departing from the spirit and scope of the invention.

We claim:

1. A crosslinked polymer electrolyte having a composition comprising (a) an amorphous solid solution of (i) at least one salt selected from the group consisting of alkali metal salts, alkali earth metal salts, transition metal salts, ammonium salts, organic ammonium salts, zinc salts, cadmium salts, mercury salts and thallium salts of (ii) at least one acid selected from the group consisting of monobasic, dibasic and tribasic acids other than haloid acids (iii) in a polymer, and (b) a crosslinking agent which crosslinks the polymer.

2. The electrolyte of claim 1, wherein said polymer includes at least one of mono-, di-, tri- and poly-functional compounds having alkyleneoxide repeat units.

3. The electrolyte of claim 1, wherein the polymer includes at least one hydroxy compound.

4. The electrolyte of claim 3, wherein said at least one hydroxy compound includes:

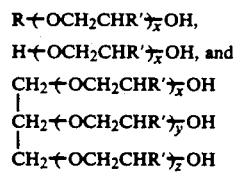

where R and R' are H or an alkyl group.

5. The electrolyte of claim 3, wherein the molecular weight of said at least one hydroxy compound is sufficiently low so that the polymer is crosslinked without crystallizing.

6. The electrolyte of claim 1, wherein the crosslinking agent is a diisocyanate.

7. The electrolyte of claim 6, wherein the diisocyanate is selected from the group consisting of hexamethylene diisocyanate, toluenediisocyanate and methyl diphenylisocyanate.

8. The electrolyte of claim 1, wherein each said at least one compound is terminated with an unsaturated functional group.

9. The electrolyte of claim 8, wherein said unsaturated functional group is selected from the group consisting of vinyl, allyl, acrylic and alkacrylic.

10. The electrolyte of claim 9, wherein said crosslinking agent is poly(alkylhydrogensiloxane).

11. The electrolyte of claim 9, wherein said crosslinking agent is a difunctional reagent.

12. The electrolyte of claim 11, wherein said difunctional reagent is an analog of the compound to be crosslinked.

13. The electrolyte of claim 11, wherein said difunctional reagent is selected from the group consisting of a divinyl, diallyl, dialkacrylic and diacrylic analog of the compound to be crosslinked.

14. The electrolyte of claim 8, wherein said compound is selected from the group consisting of:

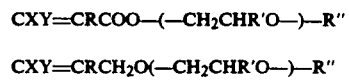

where X,Y,R and R" are H or alkyl groups and R" is H, an alkyl group or, for a difunctional compound, an unsaturated functional group.

15. The electrolyte of claim 1, wherein said crosslinking agent is selected from the group consisting of di- and multifunctional acids.

16. The electrolyte of claim 1, wherein said crosslinking agent is selected from the group consisting of di- and multifunctional amines 17. The electrolyte of claim 1, wherein said at least one salt is NaBF$_4$.

18. The electrolyte of claim 1, wherein said at least one salt is KSCN.

19. The electrolyte of claim 1, further comprising a plasticizer having a chemical compatibility with the polymer and in which said at least one salt is soluble.

20. The electrolyte of claim 19, wherein said plasticizer is one of low molecular weight alkylene oxide oligomers and polymers having minimal reaction with said polymer.

21. The electrolyte of claim 20, wherein said plasticizer contains at least one end group comprised of one of an alkyl ether, an alkyl urethane and an ester.

22. The electrolyte of claim 1, wherein the polymer is ethylene oxide based and includes pendant groups for disrupting crystallization.

23. The electrolyte of claim 22, wherein the polymer is selected from the group consisting of copolymers of ethylene oxide and propylene oxide.

24. The electrolyte of claim 23, wherein between substantially six and one hundred percent of repeat units in the polymer ar propylene oxide groups.

25. The electrolyte of any one of claims 1 to 24, formed as a layer in combination with an anode disposed to contact a first side of said layer and a cathode disposed to contact a second side of said layer opposite said first side.

26. A compact capacitor including an electrically conductive anode, an electrically conductive cathode and between said anode and said cathode a crosslinked polymer electrolyte having a composition comprising (a) an amorphous solid solution of (i) at least one salt selected from the group consisting of alkali metal salts, alkali earth metal salts, transition metal salts, ammonium salts, organic ammonium salts, zinc salts, cadmium salts, mercury salts and thallium salts of (ii) at least one acid selected from the group consisting of monobasic, dibasic and tribasic acids other than haloid acids (iii) in a polymer, and (b) a crosslinking agent which crosslinks the polymer.

27. The capacitor of claim 26, wherein said polymer includes at least one of mono-, di-, tri- and polyfunctional compounds having alkyleneoxide repeat units.

28. The capacitor of claim 26, wherein the polymer includes at least one hydroxy compound.

29. The capacitor of claim 28, wherein said at least one hydroxy compound includes:

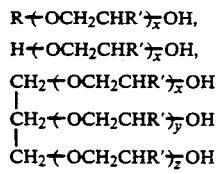

where R and R' are H or an alkyl group.

30. The capacitor of claim 28, wherein the molecular weight of said at least one hydroxy compound is sufficiently low so that the polymer is crosslinked without crystallizing.

31. The capacitor of claim 26, wherein the crosslinking agent is a diisocyanate.

32. The capacitor of claim 31, wherein the diisocyanate is selected from the group consisting of hexamethylene diisocyanate, toluenediisocyanate and methyl diphenylisocyanate.

33. The capacitor of claim 26, wherein each said at least one compound is terminated with an unsaturated functional group.

34. The capacitor of claim 33, wherein said unsaturated functional group is selected from the group consisting of vinyl, allyl, acrylic and alkacrylic.

35. The capacitor of claim 34, wherein said crosslinking agent is poly(alkylhydrogensiloxane).

36. The capacitor of claim 34, wherein said crosslinking agent is a difunctional reagent.

37. The capacitor of claim 36, wherein said difunctional reagent is an analog of the compound to be crosslinked.

38. The capacitor of claim 36, wherein said difunctional reagent is selected from the group consisting of a divinyl, diallyl, dialkacrylic and diacrylic analog of the compound to be crosslinked.

39. The capacitor of claim 33, wherein said compound is selected from the group consisting of:

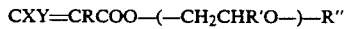

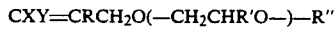

where X,Y,R and R' are H or alkyl groups and R" is H, an alkyl group or, for a difunctional compound, an unsaturated functional group.

40. The capacitor of claim 26, wherein said crosslinking agent is selected from the group consisting of di- and multifunctional acids.

41. The capacitor of claim 26, wherein said crosslinking agent is selected from the group consisting of di- and multifunctional amines.

42. The capacitor of claim 26, wherein said at least one salt is NaBF$_4$.

43. The capacitor of claim 26, wherein said at least one salt is KSCN.

44. The capacitor of claim 26, further comprising a plasticizer having a chemical compatibility with the polymer and in which said at least one salt is soluble.

45. The capacitor of claim 44, wherein said plasticizer is one of low molecular weight alkylene oxide oligomers and polymers having minimal reaction with said polymer.

46. The capacitor of claim 45, wherein said plasticizer contains at least one end group comprised of one of an alkyl ether, an alkyl urethane and an ester.

47. The capacitor of claim 26, wherein the polymer is ethylene oxide based and includes pendant groups for disrupting crystallization.

48. The capacitor of claim 47, wherein the polymer is selected from the group consisting of copolymers of ethylene oxide and propylene oxide.

49. The capacitor of claim 48, wherein between substantially six and one hundred percent of repeat units in the polymer are propylene oxide groups.

50. A method for forming an electrolytic capacitor comprising the steps of:
coating a cathode foil with a first coating of a polymerizable material having a crosslinking agent dissolved therein;
curing the first coating;

coating an anode foil with a second coating of a polymerizable material having a salt and a crosslinking agent dissolved therein;
assembling the anode and the cathode to one another in facing relationship to form a capacitor assembly;
curing the second coating.

51. The method of claim 50, wherein the cathode foil has larger dimensions than the anode foil, further comprising the step of enfolding the anode foil within the cathode foil.

52. The method of claim 51, further comprising the step of expelling excess anode coating material by applying pressure.

53. The method of claim 52, wherein pressure is applied by rolling.

54. The method of claim 51, further comprising the step of dissolving a salt in the first coating material before coating the cathode.

55. The method of claim 54, further comprising the step of winding the assembly into a roll.

56. The method of claim 50, further comprising the step of winding the assembly into a roll.

57. The method of claim 50, wherein the cathode foil is a continuous ribbon and the step of curing the first coating is achieved by passing the ribbon through a curing oven.

58. The method of claim 50, wherein the anode foil is a continuous ribbon and the second coating is applied by passing the ribbon through a bath of the polymerizable material.

59. The method of claim 50, wherein the step of assembling the anode and the cathode comprises cowinding the coated anode foil with a ribbon of coated cathode foil.

60. The method of claim 59, further comprising the step of applying pressure to expel excess coating material.

61. The method of claim 60, wherein the pressure is applied with a pressure roller.

62. A method of forming a capacitor comprising the steps of:
applying a coating to one of an anode foil and an amorphous coating foil, said coating containing a polymerizable material having a salt and a crosslinking agent dissolved therein to form a coated foil and an uncoated foil;
curing the coating; and
assembling the coated foil and the uncoated foil in facing relationship to form a capacitor assembly.

63. The method of claim 62, wherein the anode foil is coated prior to the step of assembling the coated foil and the uncoated foil.

64. The method of claim 62, wherein the cathode foil is coated prior to the step of assembling the coated foil and the uncoated foil.

65. The method of claim 61, further comprising the step of coating the uncoated foil prior to assembling the foils in facing relationship.

66. A method of forming an electrolytic capacitor comprising the steps of:
providing a three layer assembly having an anode foil, a cathode foil and a spacer disposed between said anode foil and said cathode foil,
said spacer being ultrathin and having openings occupying at least substantially twenty percent of its volume;
impregnating the assembly with an electrolyte.

67. The method of claim 66, wherein said electrolyte comprises a polymerizable material.

68. The method of claim 67, further comprising dissolving a salt in said polymerizable material.

69. The method of claim 67, further comprising adding a plasticizer to said polymerizable material.

70. The method of claim 67, further comprising polymerizing the electrolyte.

71. A capacitor comprising
an anode foil;
a cathode foil,
an ultrathin spacer having openings therein occupying at least substantially twenty percent of its volume;
an electrolyte impregnated into said openings in said spacer.

72. The capacitor of claim 71, wherein said spacer is comprised of isotactic polypropylene.

73. The capacitor of claim 72, wherein said spacer has a thickness of less than 25 $\mu$.

74. The capacitor of claim 72, wherein said spacer has a microporous structure.

75. A capacitor comprising:
an anode;
a cathode
a crosslinked polymer electrolyte disposed between said anode and said cathode;
a sealed housing for containing said anode, said cathode and said polymer electrolyte, substantially all space in said housing being occupied by said anode, said cathode and said electrolyte.

76. A capacitor comprising:
an anode;
a cathode;
a crosslinked polymer electrolyte disposed between said anode and said cathode;
a sealed housing for containing said anode, said cathode and said solid polymer electrolyte, said housing being devoid of an expansion chamber for said electrolyte.

77. A capacitor comprising:
an anode;
a cathode;
a crosslinked polymer electrolyte disposed between said anode and said cathode;
a sealed housing for containing said anode, said cathode and said polymer electrolyte, said housing being entirely occupied by said anode, said cathode and said electrolyte except for a longitudinally extending passageway therein.

78. The capacitor of claim 77, further comprising a hollow forming member for defining said passageway and wherein said anode and said cathode are rolled about said forming member.

79. A compact electrolytic capacitor including an electrically conductive anode, an electrically conductive cathode, and an electrolyte between said anode and said cathode; characterized in that the electrolyte is in the form of an ultrathin layer of a solution of (a) at least one salt selected from the group consisting of organic ammonium salts, zinc salts, cadmium salts, mercury salts and thallium salts of (b) at least one acid selected from the group consisting of monobasic, dibasic and tribasic acids other than haloid acids (c) in an ionically conductive carrier of high solvation power.

80. A compact electrolytic capacitor including an electrically conductive anode, an electrically conductive cathode, and an electrolyte between said anode and said cathode; characterized in that the electrolyte is in the form of an ultrathin layer of a solution of (a) at least one salt selected from the group consisting of organic ammonium salts, zinc salts, cadmium salts, mercury salts and thallium salts of (b) at least one acid selected from the group consisting of monobasic, dibasic and tribasic acids other than haloid acids (c) in a carrier of high solvation power; said capacitor having a breakdown voltage which is increased by at least five percent for a given construction due to action of said electrolyte.

81. A compact electrolytic capacitor including an electrically conductive anode, an electrically conductive cathode, and an electrolyte between said anode and said cathode; characterized in that the electrolyte is in the form of an ultrathin layer of a solution of (a) at least one salt selected from the group consisting of organic ammonium salts, zinc salts, cadmium salts, mercury salts and thallium salts of (b) at least one acid selected from the group consisting of monobasic, dibasic and tribasic acids other than haloid acids (c) in a carrier of high solvation power; said capacitor having a capacitance which is increased by at least five percent for a given anode construction due to action of said electrolyte.

82. A compact electrolytic capacitor including an electrically conductive anode, an electrically conductive cathode, and an electrolyte between said anode and said cathode; characterized in that the electrolyte is in the form of an ultrathin layer of a solution of (a) at least one salt selected from the group consisting of organic ammonium salts, zinc salts, cadmium salts, mercury salts and thallium salts of (b) at least one acid selected from the group consisting of monobasic, dibasic and tribasic acids other than haloid acids (c) in a carrier of high solvation power; said capacitor undergoing, under given elevated temperature and time conditions, only minimal deforming of its dielectric layer.

83. The capacitor of claim 82, wherein said elevated temperature of 60° C. and said deforming is less than substantially four percent.

84. The capacitor of claim 83, wherein said deforming takes place over a time of at least 1,000 hours.

* * * * *